US011865051B2

(12) United States Patent
Souke et al.

(10) Patent No.: US 11,865,051 B2
**(45) Date of Patent: *Jan. 9, 2024**

(54) HYDRAULIC VALVE AND SYSTEM

(71) Applicant: Stryker Corporation, Kalamazoo, MI (US)

(72) Inventors: Chad C. Souke, Vicksburg, MI (US); Ross T. Lucas, Paw Paw, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,777

(22) Filed: Jan. 17, 2023

(65) Prior Publication Data

US 2023/0149231 A1 May 18, 2023

Related U.S. Application Data

(63) Continuation of application No. 17/081,593, filed on Oct. 27, 2020, now Pat. No. 11,583,455.
(Continued)

(51) Int. Cl.
*A61G 1/056* (2006.01)
*F15B 13/01* (2006.01)
(Continued)

(52) U.S. Cl.
CPC ......... *A61G 1/0567* (2013.01); *A61G 1/0212* (2013.01); *A61G 1/0262* (2013.01);
(Continued)

(58) Field of Classification Search
CPC .. F15B 11/0423; F15B 11/044; F15B 13/015; F15B 13/0426; F15B 13/0435;
(Continued)

(56) References Cited

U.S. PATENT DOCUMENTS

| | | | |
|---|---|---|---|
| 3,000,230 | A | 9/1961 | Froslie |
| 3,530,514 | A | 9/1970 | McCalley |

(Continued)

FOREIGN PATENT DOCUMENTS

| | | |
|---|---|---|
| AU | 200072007 | 6/2001 |
| DE | 3313843 | 10/1984 |

(Continued)

OTHER PUBLICATIONS

Stryker Bertec Medical Inc., The Go Bed Maintenance Manual, Dec. 2000.

(Continued)

*Primary Examiner* — Michael Leslie
(74) *Attorney, Agent, or Firm* — Warner Norcross + Judd LLP

(57) ABSTRACT

An apparatus includes a hydraulic circuit that is configured to selectively open fluid communication between one portion of the hydraulic circuit and another portion of the hydraulic circuit, such as a reservoir, based on the flow of the hydraulic fluid in the one portion. When the flow of hydraulic fluid exceeds a selected threshold in the one portion of the hydraulic circuit, the flow of fluid urges the opening of a hydraulic component of the hydraulic circuit to allow fluid communication between the one portion and the reservoir to discharge fluid from the one portion.

20 Claims, 16 Drawing Sheets

Related U.S. Application Data

(60) Provisional application No. 62/926,711, filed on Oct. 28, 2019.

(51) Int. Cl.
*F15B 11/042* (2006.01)
*A61G 1/02* (2006.01)

(52) U.S. Cl.
CPC ......... *F15B 11/0423* (2013.01); *F15B 13/015* (2013.01); *F15B 2211/45* (2013.01)

(58) Field of Classification Search
CPC .. F15B 2211/45; F15B 11/055; F16K 31/221; Y10T 137/2589
See application file for complete search history.

(56) References Cited

U.S. PATENT DOCUMENTS

| | | | |
|---|---|---|---|
| 3,627,377 | A | 12/1971 | Pickles |
| 3,724,003 | A | 4/1973 | Ellwanger et al. |
| 4,747,212 | A | 5/1988 | Cavdek |
| 4,751,754 | A | 6/1988 | Bailey et al. |
| 5,102,377 | A | 4/1992 | Spanski |
| 5,161,274 | A | 11/1992 | Hayes et al. |
| 5,355,743 | A | 10/1994 | Tesar |
| 5,613,255 | A | 3/1997 | Bish et al. |
| 6,071,228 | A | 6/2000 | Speraw et al. |
| 6,289,534 | B1 | 9/2001 | Hakamiun et al. |
| 6,352,240 | B1 | 3/2002 | Eckstein et al. |
| 6,421,854 | B1 | 7/2002 | Heimbrock |
| 6,611,979 | B2 | 9/2003 | Welling et al. |
| 6,659,935 | B2 | 12/2003 | Costanzo |
| 6,886,200 | B2 | 5/2005 | Blyshak et al. |
| 7,140,055 | B2 | 11/2006 | Bishop et al. |
| 7,150,056 | B2 | 12/2006 | Lemire |
| 7,171,708 | B2 | 2/2007 | Osborne et al. |
| 7,296,312 | B2 | 11/2007 | Menkedick et al. |
| 7,398,571 | B2 | 7/2008 | Souke et al. |
| 7,441,291 | B2 | 10/2008 | Hayes et al. |
| 7,454,805 | B2 | 11/2008 | Osborne et al. |
| 7,533,429 | B2 | 5/2009 | Menkedick et al. |
| 7,610,637 | B2 | 11/2009 | Menkedick et al. |
| 7,653,954 | B2 | 2/2010 | Hornbach et al. |
| 7,694,368 | B2 | 4/2010 | Lewis, Jr. |
| 7,703,158 | B2 | 4/2010 | Wilker, Jr. et al. |
| 7,886,380 | B2 | 2/2011 | Hornbach et al. |
| 7,913,335 | B2 | 3/2011 | Carr |
| 7,926,131 | B2 | 4/2011 | Menkedick et al. |
| 8,051,513 | B2 | 11/2011 | Reed et al. |
| 8,074,309 | B2 | 12/2011 | Hutchison et al. |
| 8,104,120 | B2 | 1/2012 | Hornbach et al. |
| RE43,193 | E | 2/2012 | Osborne et al. |
| 8,151,387 | B2 | 4/2012 | Osborne et al. |
| 8,176,584 | B2 | 5/2012 | Hornbach et al. |
| 8,239,983 | B2 | 8/2012 | Chinn |
| 8,256,048 | B2 | 9/2012 | Bly et al. |
| 8,291,532 | B2 | 10/2012 | Hornbach et al. |
| 8,321,976 | B1 | 12/2012 | Edgerton |
| 8,458,833 | B2 | 6/2013 | Hornbach et al. |
| 8,502,663 | B2 | 8/2013 | Riley et al. |
| 8,607,384 | B2 | 12/2013 | Hornbach |
| 8,621,690 | B2 | 1/2014 | Hornbach et al. |
| 8,844,078 | B2 | 9/2014 | Hornbach et al. |
| 8,863,331 | B2 | 10/2014 | Valentino et al. |
| 9,138,173 | B2 | 9/2015 | Penninger et al. |
| 9,227,822 | B2 | 1/2016 | Horne |
| 9,677,575 | B2 | 6/2017 | Hilzendegen et al. |
| 10,898,399 | B2 | 1/2021 | Paul et al. |
| 10,987,260 | B2 | 4/2021 | Souke et al. |
| 11,583,455 | B2 * | 2/2023 | Souke .................. F15B 11/044 |
| 2002/0178502 | A1 | 12/2002 | Beasley et al. |
| 2004/0055087 | A1 | 3/2004 | Edgerton |
| 2007/0169269 | A1 | 7/2007 | Wells |
| 2007/0245889 | A1 | 10/2007 | Breunig et al. |
| 2009/0165208 | A1 | 7/2009 | Reed et al. |
| 2009/0222988 | A1 | 9/2009 | Reed et al. |
| 2010/0000017 | A1 | 1/2010 | Laloge et al. |
| 2010/0199433 | A1 | 8/2010 | Clenet |
| 2012/0124746 | A1 | 5/2012 | Andrienko et al. |
| 2014/0033435 | A1 | 2/2014 | Jutras |
| 2014/0041120 | A1 | 2/2014 | Li |
| 2014/0189954 | A1 | 7/2014 | Lee |
| 2014/0325759 | A1 | 11/2014 | Bly et al. |
| 2016/0136021 | A1 | 5/2016 | Roussy et al. |
| 2016/0302985 | A1 | 10/2016 | Tessmer et al. |
| 2017/0172819 | A1 | 6/2017 | Bourgraf et al. |
| 2018/0214326 | A1 | 8/2018 | Lacasse et al. |
| 2019/0247254 | A1 | 8/2019 | Naber et al. |
| 2019/0247257 | A1 | 8/2019 | Furman et al. |
| 2020/0054506 | A1 | 2/2020 | Gallingani |
| 2020/0330306 | A1 | 10/2020 | Elku et al. |
| 2021/0121338 | A1 | 4/2021 | Lucas |
| 2021/0121339 | A1 | 4/2021 | Souke et al. |
| 2021/0186781 | A1 | 6/2021 | Souke et al. |

FOREIGN PATENT DOCUMENTS

| | | |
|---|---|---|
| EP | 0 364 394 | 4/1990 |
| EP | 0 736 275 | 10/1996 |
| JP | H02-156950 | 6/1990 |
| KR | 2014-0003301 | 1/2014 |
| WO | 96/29970 | 10/1996 |
| WO | 01/17399 | 3/2001 |
| WO | 01/17400 | 3/2001 |
| WO | 01/23847 | 4/2001 |
| WO | 2007/069912 | 6/2007 |
| WO | 2013/066198 | 5/2013 |
| WO | 2014/150652 | 9/2014 |
| WO | 2014/191684 | 12/2014 |
| WO | 2015/032003 | 3/2015 |

OTHER PUBLICATIONS

Stryker Bertec Medical Inc., The Go Bed Operations Manual, Dec. 2000.

Stryker, S3 MedSurg Bed with StayPut Frame Operations Manual, Jun. 2016.

* cited by examiner

HYDRAULIC VALVE AND SYSTEM

This application claims the benefit of U.S. patent application Ser. No. 17/081,593 filed on Oct. 27, 2020, entitled HYDRAULIC VALVE AND SYSTEM, by inventors Chad C. Souke and Ross T. Lucas, which claims the benefit of U.S. provisional patent application Ser. No. 62/926,711 filed Oct. 28, 2019, entitled HYDRAULIC VALVE AND SYSTEM by inventors Chad C. Souke and Ross T. Lucas, which are hereby incorporated by reference in their entireties.

TECHNICAL FIELD AND BACKGROUND

The present disclosure relates to a hydraulic valve and control system that can be used, for example, in a patient handling apparatus, such as emergency cot, medical bed, stretcher, stair chair, or other apparatuses that support a patient where increased speed of a component, such as a hydraulic cylinder used to move the base of a patient handling apparatus, is desired.

For example, when a patient handling apparatus, such as an emergency cot, is to be loaded into an emergency vehicle, such as an ambulance, the patient handling apparatus is moved to the rear of the emergency vehicle where it is then at least partially inserted into the compartment so that it is initially supported on one end, for example, by its head end wheels resting on the compartment floor. Alternately, the cot may be moved onto a loading arm or arms, which extend from the emergency vehicle into the cot and fully support the cot, but do not interfere with the lifting mechanism. In any case, once the cot is supported (either by the head end wheels or a loading arm or loading arm(s)), the base can be raised to allow the cot to then be fully loaded in to the emergency vehicle. The faster the base can be raised, the faster the patient handling apparatus can be loaded into the vehicle, and the quicker the patient weight can be unloaded from a caregiver and transferred to the emergency vehicle, which significantly reduces the stress and strain on a caregiver. The increase speed also increases the speed at which the patient can be handled and delivered to the medical facility, typically an emergency room. Therefore, quick retraction of the base can be significant to the caregiver in all cases and even more significant to the patient in some cases.

Accordingly, there is a need to provide a patient handling apparatus with a hydraulic valve and control system that can quickly move one component relative to another component, such as an emergency cot's base relative to the cot's frame without inducing an unacceptable increase in pressure in the hydraulic cylinder that is doing the work.

SUMMARY

Accordingly, a hydraulic valve and control system is disclosed that can move one hydraulic component relative to another hydraulic component more quickly when needed.

In one embodiment, an apparatus includes a hydraulic circuit. The hydraulic circuit is configured to selectively open fluid communication between one portion of the hydraulic circuit and another portion of the hydraulic circuit based on the flow of the hydraulic fluid in the one portion. When the flow of hydraulic fluid exceeds a selected threshold in the one portion of the hydraulic circuit, the flow of fluid urges the opening of a hydraulic component of the hydraulic circuit to allow communication between the one portion and the other portion of the hydraulic circuit.

For example, the one portion of the hydraulic component comprises a pilot operated control valve. The pilot operated control valve has a first chamber with a first inlet, a second inlet, an outlet, and a pilot piston assembly mounted for movement in the first chamber. The pilot piston assembly includes a pilot piston with a piston side facing the first inlet and a pilot rod that extends from the first chamber into a second chamber, which is sealed from the first chamber. The second inlet is in fluid communication with the outlet of the first chamber so that fluid flows from the outlet of the first chamber during all fluid flow conditions. The second chamber includes an inlet, an outlet, and a valve poppet movably mounted in the second chamber between a closed position wherein the inlet of the second chamber is not in fluid communication with the outlet of the second chamber and one or more open positions wherein the inlet of the second chamber is in fluid communication with the outlet of the second chamber. When the fluid flow to the first inlet of the first chamber exceeds a preselected flow rate, back pressure at the inlet of the first chamber will move the pilot piston and cause the pilot rod to move the valve poppet from its closed position to one of its open positions to allow fluid flow from the inlet of the second chamber to the outlet of the second chamber.

In another embodiment, a pilot operated control valve includes a first chamber with a first inlet, a second inlet, an outlet, and a pilot piston assembly mounted for movement in the first chamber. The pilot piston assembly includes a pilot piston with a piston side facing the first inlet and a pilot rod that extends from the first chamber into a second chamber, which is sealed from the first chamber. The second inlet is in fluid communication with the outlet of the first chamber so that fluid flows from the outlet of the first chamber during all fluid flow conditions. The second chamber includes an inlet, an outlet, and a valve poppet movably mounted in said chamber between a closed position wherein the inlet of the second chamber is not in fluid communication with the outlet of the second chamber and one or more open positions wherein the inlet of the second chamber is in fluid communication with the outlet of the second chamber. When the fluid flow to the first inlet of the first chamber exceeds a preselected flow rate, back pressure at the inlet of the first chamber will move the pilot piston and cause the pilot rod to move the valve poppet from its closed position to one of its open positions to allow fluid flow from the inlet of the second chamber to the outlet of the second chamber.

For example, in one aspect, the pilot operated control valve includes a valve body, such as a cylindrical valve body, with the first and second chambers located in the valve body.

In a further aspect, the second inlet is formed in the valve body. For example, the second inlet may be formed by two or more orifices formed in the valve body wall.

In another embodiment, the second inlet is formed by a passageway through the pilot piston.

In yet another embodiment, an apparatus includes a hydraulic circuit and a hydraulic cylinder. The hydraulic cylinder has a rod, a cap end chamber, and a rod end chamber. The hydraulic circuit is operable to direct the flow of hydraulic fluid between a pump, the hydraulic cylinder, and a reservoir. Further, the hydraulic circuit is configured to selectively open fluid communication between one chamber of the hydraulic cylinder and the reservoir based on the flow condition of the hydraulic fluid flowing to the other chamber of the hydraulic cylinder to thereby allow faster evacuation of the hydraulic fluid from the one chamber of the hydraulic cylinder.

In one aspect, the hydraulic circuit is configured to selectively open fluid communication between the cap end chamber of the hydraulic cylinder and the reservoir to allow the hydraulic fluid to be quickly exhausted from the cap end chamber based on the flow condition of the hydraulic fluid flowing to the rod end chamber of the hydraulic cylinder.

According to yet another form of the disclosure, a patient handling apparatus includes a hydraulic circuit and a hydraulic cylinder to raise or lower a component of the patient handling apparatus. The hydraulic cylinder has a rod, a cap end chamber, and a rod end chamber. The hydraulic circuit is operable to direct the flow of hydraulic fluid between a pump, the hydraulic cylinder, and a reservoir. Further, the hydraulic circuit is configured to selectively open fluid communication between one chamber of the hydraulic cylinder and the reservoir based on the flow condition of the hydraulic fluid flowing to the other chamber of the hydraulic cylinder to thereby allow faster evacuation of the hydraulic fluid from the one chamber of the hydraulic cylinder.

In one aspect, the patient handling apparatus includes a frame, a base, and a lift assembly supporting the frame relative to the base. The hydraulic cylinder is configured to extend or retract the lift assembly to thereby raise or lower the base or the frame with respect to the other.

In yet another aspect, the hydraulic circuit includes a control valve to control the fluid communication between the cap end chamber and the reservoir, and the hydraulic circuit is configured to selectively open the control valve to allow fluid to evacuate at least some of the hydraulic fluid from the cap end chamber to the reservoir based on the flow condition of the hydraulic fluid flowing to the rod end chamber. For example, the hydraulic circuit is configured to selectively open the control valve when there is a high flow condition to the rod end chamber of the hydraulic cylinder to thereby allow faster evacuation of the hydraulic fluid from the cap end chamber of the hydraulic cylinder.

In other aspects, the control valve is a pilot operated control valve that includes a first chamber with a first inlet, a second inlet, an outlet, and a pilot piston assembly mounted for movement in the first chamber. The pilot piston assembly includes a pilot piston with a piston side facing the first inlet and a pilot rod that extends from the first chamber into a second chamber, which is sealed from the first chamber. The second inlet is in fluid communication with the outlet of the first chamber so that fluid flows from the outlet of the first chamber during all fluid flow conditions. The second chamber includes an inlet, an outlet, and a valve poppet movably mounted in the second chamber between a closed position wherein the inlet of the second chamber is not in fluid communication with the outlet of the second chamber and one or more open positions wherein the inlet of the second chamber is in fluid communication with the outlet of the second chamber. When the fluid flow to the first inlet of the first chamber exceeds a preselected flow rate, back pressure at the inlet of the first chamber will move the pilot piston and cause the pilot rod to move the valve poppet from its closed position to one of its open positions to allow fluid flow from the inlet of the second chamber to the outlet of the second chamber.

In another embodiment, a method of loading a patient handling apparatus from a cargo area of an emergency vehicle includes moving the patient handling apparatus adjacent an opening to the cargo area of an ambulance and supporting the litter frame of the patient handling apparatus in a manner such that the base is free to be raised relative to the litter frame (and hence deck). The method further includes directing hydraulic fluid at a high flow rate to the rod end of the lift assembly hydraulic cylinder and, based on that high flow rate, directing at least some of the hydraulic fluid from the cap end of the hydraulic cylinder to a reservoir, to thereby allow faster discharge or evacuation of the hydraulic fluid from the cap end chamber of the hydraulic cylinder.

Accordingly, the present disclosure provides a hydraulic valve and hydraulic circuit that can improve the control over the movement of a component of an apparatus, such as a patient handling apparatus, and further allows the component to be moved quickly while maintaining acceptable pressure in the hydraulic circuit.

These and other objects, advantages, purposes and features of the disclosure will become more apparent from the study of the following description taken in conjunction with the drawings.

DETAILED DESCRIPTION

Figure 1:
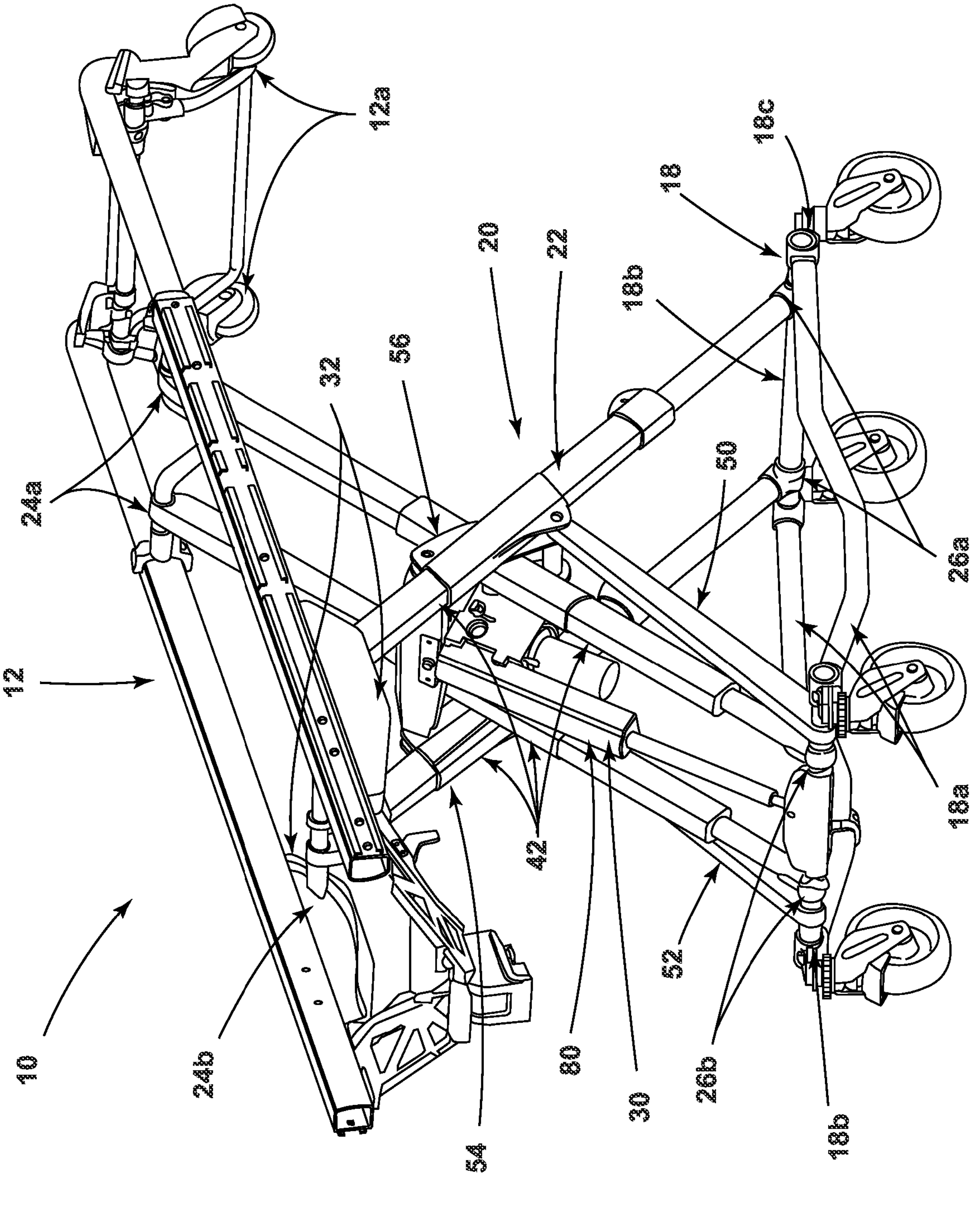
FIG. 1 is a perspective view of a patient handling apparatus (with the patient support surface removed) with the lift assembly in its fully raised configuration.

Referring to FIG. 1, the numeral 10 generally designates a patient handling apparatus. The term "patient handling apparatus" is used broadly to mean an apparatus that can support a patient, such as a medical bed, including an apparatus that can transport a patient, such as an emergency cot, a stretcher, a stair chair, or other apparatuses that support and/or transport a patient. Further, the term "patient" is used broadly to include persons that are under medical treatment or an invalid, or persons who just need assistance. Although the patient handling apparatus 10 is illustrated herein as an emergency cot, the term "patient handling apparatus" should not be so limited.

Referring again to FIGS. 1-3, patient handling apparatus 10 includes a frame 12, which in the illustrated embodiment comprises a litter frame that supports a litter deck (shown in phantom in FIG. 3), which provides a patient support surface, and a base 18. As will be more fully described below, patient handling apparatus 10 includes a lift assembly 20 that raises or lowers the base 18 or the frame 12 with respect to the other so that the patient handling apparatus 10 can be rearranged between a more compact configuration, for example, for loading into an emergency vehicle, such as an ambulance, and a configuration for use in transporting a patient across a ground surface. Further, as will be more fully described below, the mounting of lift assembly 20 to the frame 12 is optionally configured to allow the frame 12 to be tilted relative to the lift assembly 20 so that one end (e.g. head-end or foot-end) of the frame 12 can be raised beyond the fully raised height of the lift assembly to allow the patient handling apparatus to be inserted more easily into the compartment of an emergency vehicle.

Referring again to FIG. 1, frame 12 is mounted to base 18 by lift assembly 20, which includes load bearing members 22 pivotally coupled to the frame 12 and to the base 18. In the illustrated embodiment, load bearing members 22 are pivotally coupled to the frame 12 by head-end upper pivot connections **24*a* and foot-end upper pivot connections 24*b*. Further, as will be more fully described below, head-end upper pivot connections 24*a* are fixed to the frame 12 along the longitudinal axis 12*b* of frame 12 and foot-end upper pivot connections 24*b* are movable so that the head-end of frame 12** can be tilted upwardly, as more fully described below.

Figure 2:
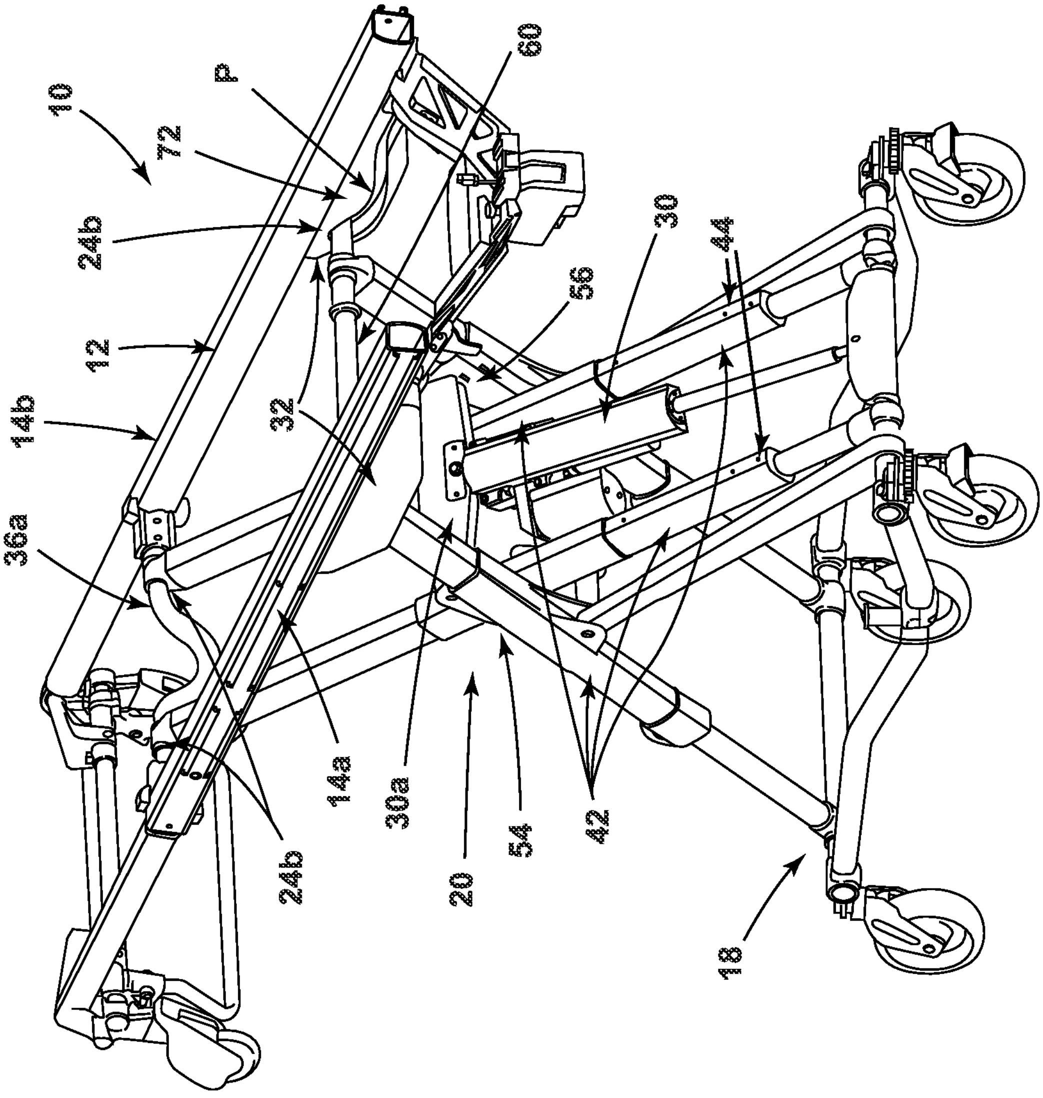
FIG. 2 is a second perspective view of the patient handling apparatus of FIG. 1.
Figure 3:
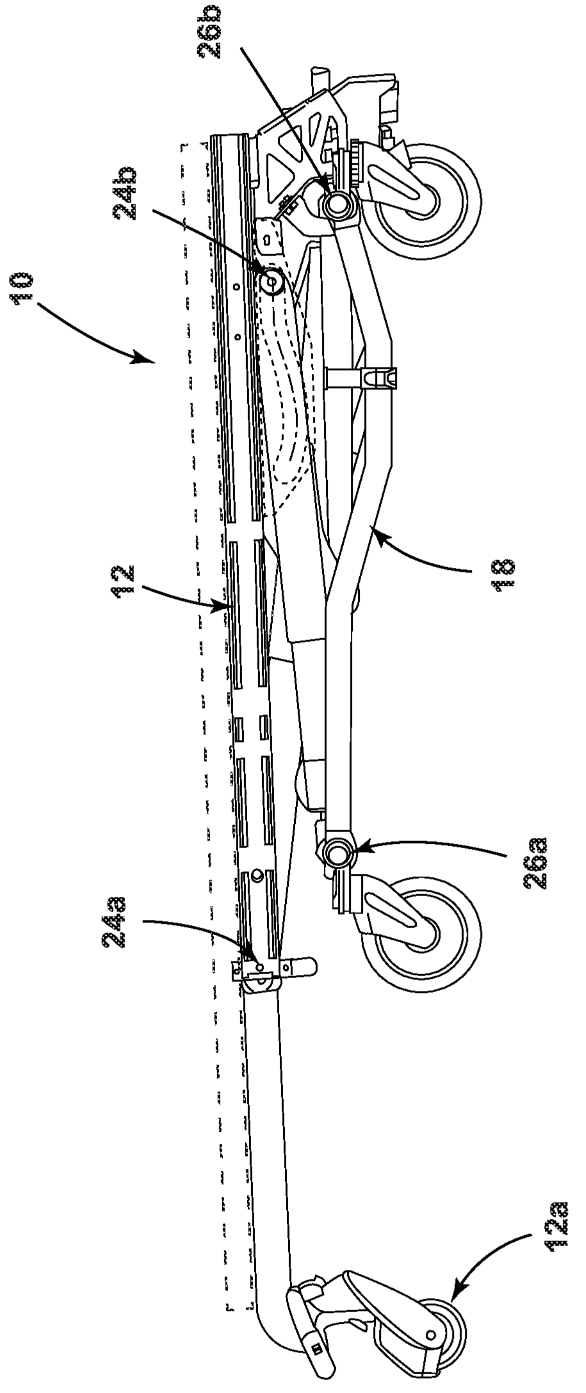
FIG. 3 is a side elevation view of the patient handling apparatus in its fully lowered configuration.

In the illustrated embodiment, each load bearing member 22 comprises a telescoping compression/tension member 42. Compression/tension members 42 may be pivotally joined at their medial portions about a pivot axis to thereby form a pair of X-frames 44 (FIG. 2). The upper ends of each X-frame 44 are, therefore, pivotally mounted to the frame 12 by head-end upper pivot connections **24*a* and foot-end upper pivot connections 24*b*. The lower ends of each X-frame 44 are pivotally mounted to the base 18 by head-end lower pivot connections 26*a* and foot-end lower pivot connections 26*b*. However, it should be understood that load bearing members 22** may comprise fixed length members, for example such of the type shown in U.S. Pat. No. 6,701,545, which is commonly owned by Stryker Corp. of Kalamazoo, MI and incorporated herein by reference in its entirety. For another example of suitable lift assemblies reference is made to U.S. Pat. Nos. 7,398,571 and 9,486,373, which are commonly owned by Stryker Corp. of Kalamazoo, MI and incorporated herein by reference in their entireties.

In addition to load bearing members 22, patient handling apparatus 10 includes a pair of linkage members 50 and 52 (FIG. 1), which are pivotally mounted on one end to transverse frame members **18*b* of base 18 and on their other ends to brackets 54, 56 (FIG. 1), which mount to the X-frames and also provide a mount for a linear actuator 30 (FIG. 1), which extends or contracts the lift assembly to raise or lower frame 14 relative to the base 18 (or raise or lower base relative to the frame 12) described below. Brackets 54 and 56, therefore, pivotally mount linkage members 50 and 52, as well as actuator 30 (described below), to the X-frames 44 (FIG. 2) so that members 50 and 52 provide a timing link function as well as a moment coupling function. It should be understood that multiple actuators may be used to raise or lower frame 12**.

Figure 5:
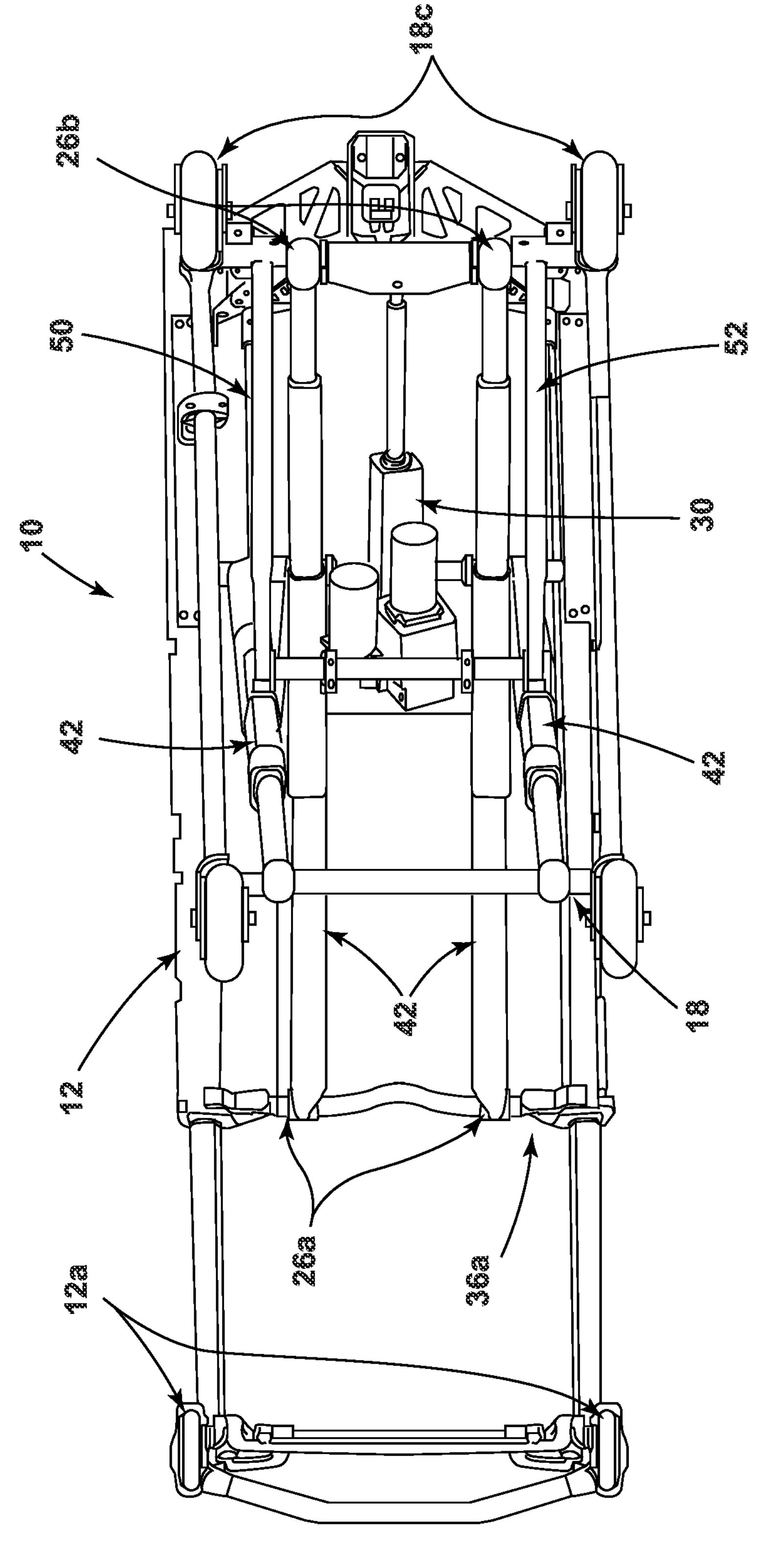
FIG. 5 is a bottom plan view of the patient handling apparatus of FIG. 3.

As best seen in FIG. 1, base 18 is formed by longitudinal frame members **18*a* and transverse frame members 18*b*, which are joined together to form a frame for base 18. Mounted to the longitudinal frame members 18*a* are bearings 18*c*, such as wheels or castors. Transverse frame members 18*b* provide a mount for the lower pivot connections 26*a*, 26*b* (FIGS. 3 and 5) of load bearing members 22 and also for the rod end of the actuator 30. As described above, the upper end of actuator 30 is mounted between the X-frames (formed by load bearing members 22) by a transverse member 30*a* (FIG. 1A) that is mounted to brackets 54, 56**.

As noted above, lift assembly 20 is extended or contracted by actuator 30. In the illustrated embodiment actuator 30 comprises a hydraulic cylinder 80, which is controlled by a control system 82. Although one actuator is illustrated, it should be understood that more than one actuator or cylinder may be used. As will be more fully described below, control system 82 includes a hydraulic circuit 90 and a controller 120, which is in communication with hydraulic circuit 90 and a user interface **120*a* that allows an operator to select between the lifting, lowering, and raising functions described herein. For example, user interface controls 120*a* may have a touch screen with touch screen areas or may comprise a key pad with push buttons, such as directional buttons, or switches, such as key switches, that correspond to the lifting, lowering, raising, and retracting functions described herein to allow the user to select the mode of operation and generate input signals to controller 120. As will be more fully described below, the controller 120** may also automatically control the mode of operation.

Referring again to FIGS. 6-8, cylinder 80 includes cylinder housing 84 with a reciprocal rod 86. Mounted at one end of rod 86 is a piston 88, which is located within the cylinder housing 84. The distal end of the reciprocal rod 86 is extended from housing 84 and connected in a conventional manner to transverse member **18*b* of base 18. And as described above, the other end or fixed end (or cap end) of cylinder 80 is mounted between brackets 54, 56**.

Cylinder 80 is extended or retracted by control system 82 to extend or contract lift assembly 20 and generally operates in four modes, namely (first mode) to raise the frame 12 when base 18 is supported on, for example, a ground surface (FIG. 6), (second mode) to lower the frame 12 when base 18 is supported on, for example, a ground surface (FIG. 7), (third mode) to lower or extend base 18 when apparatus 10 is in its loading (compact) configuration and when the frame 12 is supported, for example, by an attendant or a loading and unloading apparatus (FIG. 8), or (fourth mode) to raise base 18 when the frame 12 is supported, for example, by an attendant or a loading and unloading apparatus (FIG. 7) and when apparatus 10 is its transport (raised) configuration to reconfigure the apparatus into its loading (compact) configuration. As will be more fully described below, when lowering base 18 relative to frame 12 (when frame 12 is supported) control system 82 is configured to automatically lower or extend base 18 at a faster speed unless certain conditions exist.

Figure 6:
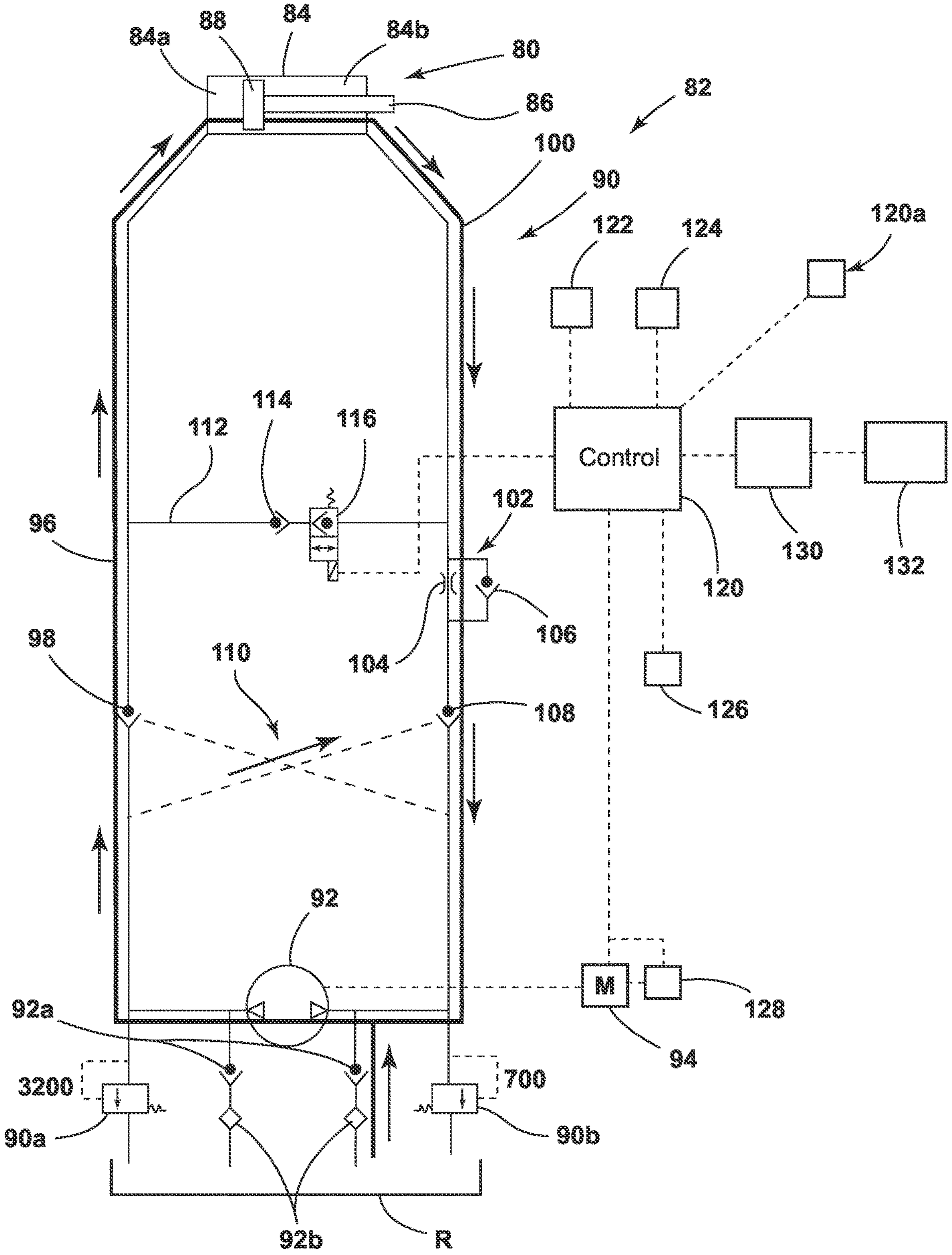
FIG. 6 is a hydraulic circuit diagram of the hydraulic system and control system in one embodiment of the patient handling apparatus illustrating the flow of hydraulic fluid in the lifting or raising mode of the frame relative to the base of the patient handling apparatus when the base is supported on a ground surface or lowering the base in a low flow condition when the frame is supported.
Figure 7:
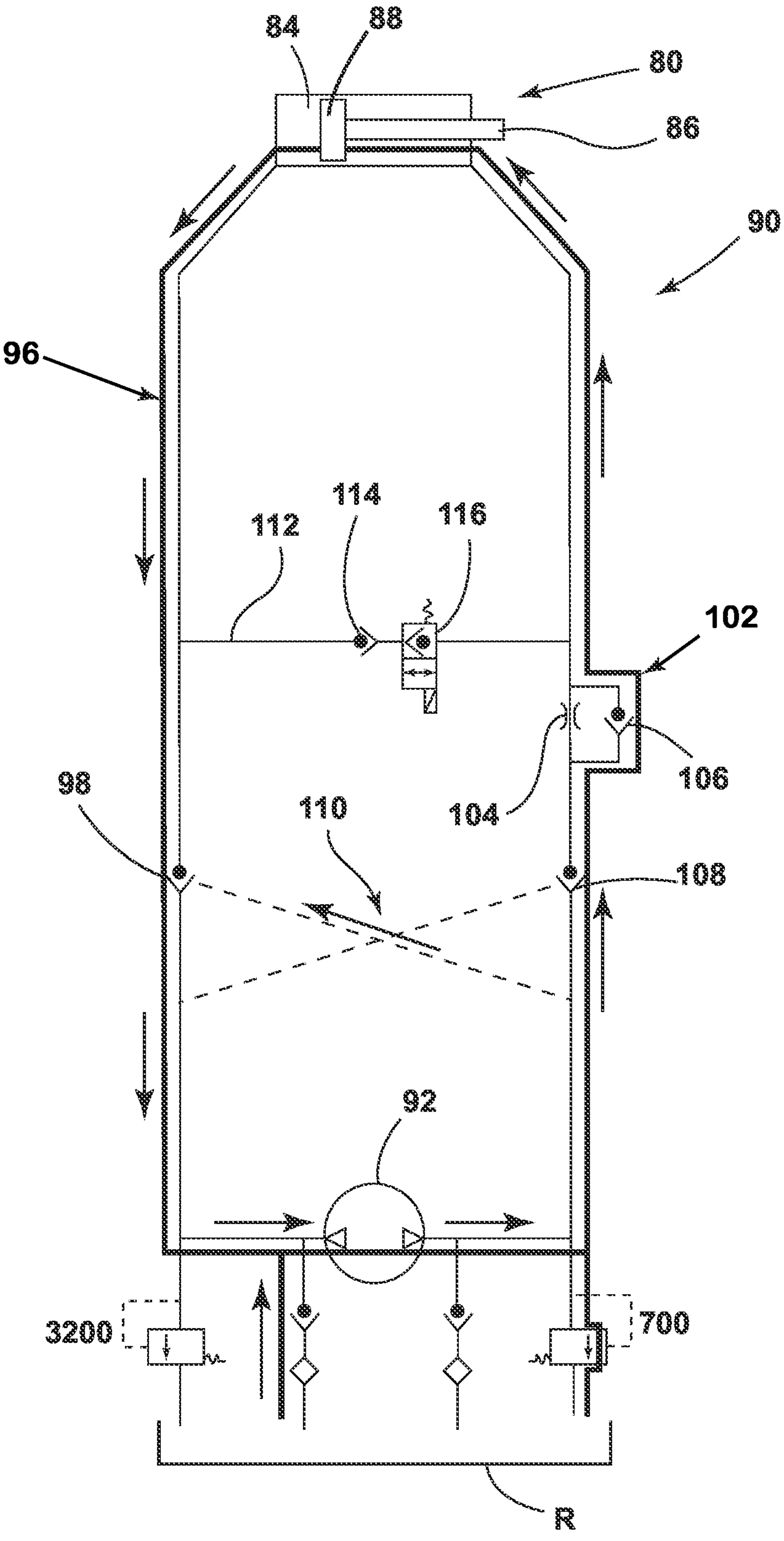
FIG. 7 is the hydraulic circuit diagram of FIG. 6 illustrating the flow of hydraulic fluid in the raising or retracting mode of the base of the patient handling apparatus when the frame is raised and supported by an emergency vehicle or when lowering the frame in a low flow condition when the base is supported.
Figure 8:
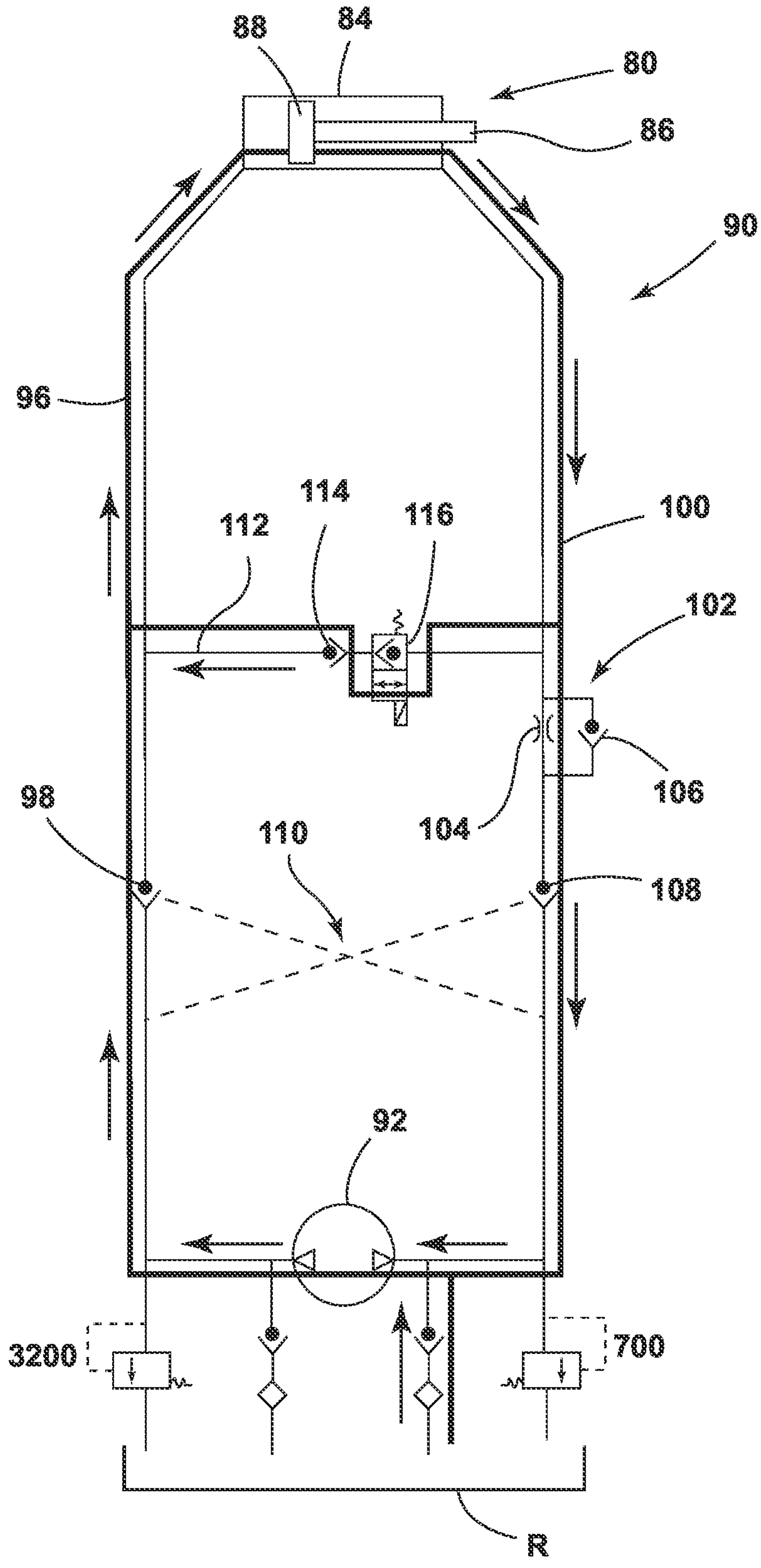
FIG. 8 is the hydraulic circuit diagram of FIG. 6 illustrating the flow of hydraulic fluid in the lowering mode of the base of the patient handling apparatus in a faster mode, for example, when the patient handling apparatus is in a compact configuration and the frame is supported by an emergency vehicle or lowering the frame in a faster mode when the base is supported.

Referring to FIGS. 6-8, hydraulic circuit 90 includes a pump 92, which is in fluid communication with a fluid reservoir or reservoir R, to pump fluid from the reservoir R to the cylinder 80. As best seen in FIG. 6, when a user selects the first mode of operation (e.g. via the user interface) to raise or lift the frame 12, controller 120 powers motor 94, which operates pump 92 to pump fluid from the reservoir R, through filters 92*b* and check valves 92*a*, into the hydraulic circuit 90 to direct the flow of fluid to cylinder 80. To avoid over pressurization, for example, when a heavy patient is supported on frame 12, fluid may be discharged from the hydraulic circuit 90. For example, when the pressure in the hydraulic circuit 90 exceeds a designated pressure (e.g. 3200 psi on the cap side of the hydraulic circuit, and 700 psi on the rod side of the hydraulic circuit) through pressure relief valves 90*a* and 90*b*. It is to be understood that the pump 92, cylinder 80, and the various conduits carrying hydraulic fluid to the cylinder are typically always filled with hydraulic fluid. Pump 92 is driven by an electric motor 94 (both of which are optionally reversible), which motor is controlled by controller 120 to thereby control pump 92.

Referring again to FIG. 6, when an operator wishes to raise frame 12 relative to base 18 (first mode), and base 18 is supported on a support surface, the operator, using interface controls 120*a* (FIG. 6), generates input signals that are communicated to controller 120. When operating in the first mode, the output of the pump 92 (in the direction indicated by the arrows in FIG. 6), will supply hydraulic fluid through a hydraulic conduit 96 to the cap end chamber 84*a* of the cylinder housing 84, which is on the piston side of rod 86. Hydraulic circuit 96 includes a pilot operated check valve 98 that is opened when fluid flows to the cap end chamber 84*a* and closed when fluid to the cap end chamber 84*a* stops to retain the pressure in the cap end chamber 84*b* until it is opened by the pilot signal received from the other side of the hydraulic circuit (check valve 108, described below) to allow the flow fluid from the cap end chamber 84*a* of cylinder 84 in the reverse direction when the rod is being retracted.

When fluid is directed to cap end chamber 84*a*, the rod 86 will extend to raise the frame 12 relative to base 18 at a first speed. This mode of operation is used when base 18 is supported on a support surface, such as the ground, which can be detected by a controller 120 in various ways described below. It should be understood, that the first mode may also be used to lower or extend base 18 when the faster speed of the third mode described below is not appropriate or desired.

Referring to FIG. 7, when an operator user wishes to select the second mode or the fourth mode—that is lower the frame 12 relative to base 18 (when base 18 is supported on a support surface) or raise base 18 relative to frame 12 (when frame 12 is supported), using interface controls 120*a*, the operator will generate an input signal to controller 120 that will cause controller 120 to operate in the second mode or the fourth mode. In the second mode or the fourth mode, the direction of pump 92 is reversed, so that fluid will flow in an opposite direction (see arrows in FIG. 7) to cylinder 80 through a second hydraulic conduit 100, which is in fluid communication and connected to the rod end chamber 84*b* of the cylinder housing 84. Conduit 100 includes a check valve assembly 102, with an orifice or fluid throttle 104 and a poppet or check valve 106 in parallel, to control the flow of fluid through conduit 100. Fluid flow in this direction will cause the rod 86 to retract and raise the base 12 when the frame 12 is supported or lower the frame 12 relative to base 18 when the base 18 is supported.

Also provided is a second pilot operated check valve 108 connected between the valve assembly 102 and pump 92. Optionally, valves 98 and 108 are provided as a dual pilot operated check valve assembly 110, which includes both valves (98 and 108) and allows fluid flow through each respect conduit in either direction. The valves 98 and 108 of the dual pilot check valve assembly 110 are operated by the fluid pressure of the respective branch of fluid conduit (96 or 100) as well as the fluid pressure of the opposing branch of fluid conduit (96 or 100), as schematically shown by the dotted lines in FIGS. 6-8.

Referring to FIG. 8, when an operator selects the base 18 lowering function and the litter is supported (and the base is unsupported), controller 120 will automatically increase the speed of the cylinder 80 over the first speed (the third mode). As would be understood by those skilled in the art, the speed of the cylinder or cylinders may be increased by increasing the flow of hydraulic fluid and/or pressure of the hydraulic fluid flowing to the cylinder(s)) unless certain conditions exist. Optionally, user interface 120*a* may allow an operator to generate an input signal to select the third mode and/or to disable the third mode.

In order to speed up the extension of rod 86 when operating in the third mode, hydraulic circuit 90 includes a third hydraulic conduit 112, which is in fluid communication with conduits 96 and 100 via a check valve 114, to thereby allow fluid communication between the cap end chamber 84*a* and the rod end chamber 84*b* and to allow at least a portion of the fluid output from the rod end chamber 84*b* to be redirected to the cap end chamber 84*a*, which increases the speed of the rod 86 (i.e. by increasing the pressure and/or fluid flow of the fluid delivered to the end cap chamber 84*a*).

To control (e.g. open and close) fluid communication between the cap end chamber 84*a* and rod end chamber 84*b* via conduit 112, conduit 112 includes a valve 116, such as a solenoid valve or a proportional control valve, which is normally closed but selectively controlled (e.g. opened) to open fluid communication between the rod end chamber 84*b* and the cap end chamber 84*a* as described below. As noted, this will allow at least a portion of the fluid output from the rod end chamber 84*b* to be redirected to the end cap chamber 84*a* to thereby increase the speed of rod 86. Optionally, an additional valve, (not shown) such as a solenoid valve, may be included in conduit 100, for example, between conduit 112 and pump 92, which is normally open but can be selectively controlled (e.g. closed), so that the amount of fluid (and hence fluid pressure and/or fluid flow) that is redirected from the rod end chamber 84*b* may be varied. For example, all the fluid output from rod end chamber 84*b* may be redirected to the cap end chamber 84*a*. In another embodiment, an additional electrically operated proportional control valve may be used in any of the branches of the conduit (e.g. 96, 100, or 112) to control the rate of fluid flow through the respective conduits and thereby control and vary the speed of the extension of rod 86.

As noted above, control system 82 includes controller 120, which is also schematically represented in FIG. 6. Controller 120 may be powered by the battery (not shown) on board the patient handling apparatus 10. A hydraulic fluid pressure monitoring device (not shown) may be connected to the hydraulic circuit 90 to provide a signal to controller 120 indicative of the magnitude of the fluid pressure, which may be used as input when controlling the hydraulic cylinder 80.

Referring again to FIG. 6, controller 120 may be in communication with one or more sensors, which generate input signals to controller 120 (or controller 120 may detect the state of the sensor) to allow controller 120 to adjust the hydraulic circuit based on an input signal or signals from or the status of the sensors, described more fully below. Suitable sensors may include Hall Effect sensors, proximity sensors, reed switches, optical sensors, ultrasonic sensors, liquid level sensors (such as available from MTS under the brand name TEMPOSONIC) linear variable displacement transformer (LV DT) sensors, or other transducers or the like.

For example, controller 120 may control (e.g. open or close) the valve 116 to increase or stop the increased speed of cylinder 80 and/or slow or stop the pump to slow or stop the cylinder, or any combination thereof based on an input signal or signals from or the status of the sensor(s). Further, controller 120 may control (e.g. close) the valve 116 before, after, or at the same time as slowing or stopping the pump based on an input signal or signals from or the status of the sensor(s). Alternately, controller 120 may slow, increase the speed of, or stop the pump P in lieu of controlling (e.g. closing) the valve 116 based on an input signal or signals from or the status of the sensor(s). For example, when there is no weight is sensed on the base, the motor may be configured to drive the pump at a higher speed (e.g. by increasing the motor pulse width modulation (PWM)) to generate higher fluid flow and this pressure.

As described in copending application, entitled, HYDRAULIC CIRCUIT FOR A PATIENT HANDLING APPARATUS, filed on even date herewith, in one embodiment, control system 82 may include one or more sensors to detect when the base 18 of the patient handling apparatus 10 is contacting the ground or other surface, such as a bumper or another obstruction, which, as noted, may be used as an input signal or signals to the controller 120 to control the hydraulic circuit 90. Suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or other transducers or the like. For further details reference is made to the copending application, which is incorporated by reference herein in its entirety.

As described in the referenced application, controller 120 may control (e.g. open or close) the valve 116 to increase or stop the increased speed of cylinder 80 and/or slow or stop the pump to slow or stop the cylinder, or any combination thereof based on an input signal or signals from or the status of the sensor(s). Further, controller 120 may control (e.g. close) the valve 116 before, after, or at the same time as slowing or stopping the pump based on an input signal or signals from or the status of the sensor(s). Alternately, controller 120 may slow, increase the speed of, or stop the pump P in lieu of control (e.g. close) the valve 116 based on an input signal or signals from or the status of the sensor(s). For example, when there is no weight is sensed on the base, the motor may be configured to drive the pump at a higher speed (e.g. by increasing the motor pulse width modulation (PWM)) to generate higher fluid flow and this pressure.

Further, in addition, or alternately, control system 82 may include one or more sensors 124 (FIG. 6) that detect the height of the patient handling apparatus 10. Similarly, suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or the like.

Figure 1A:
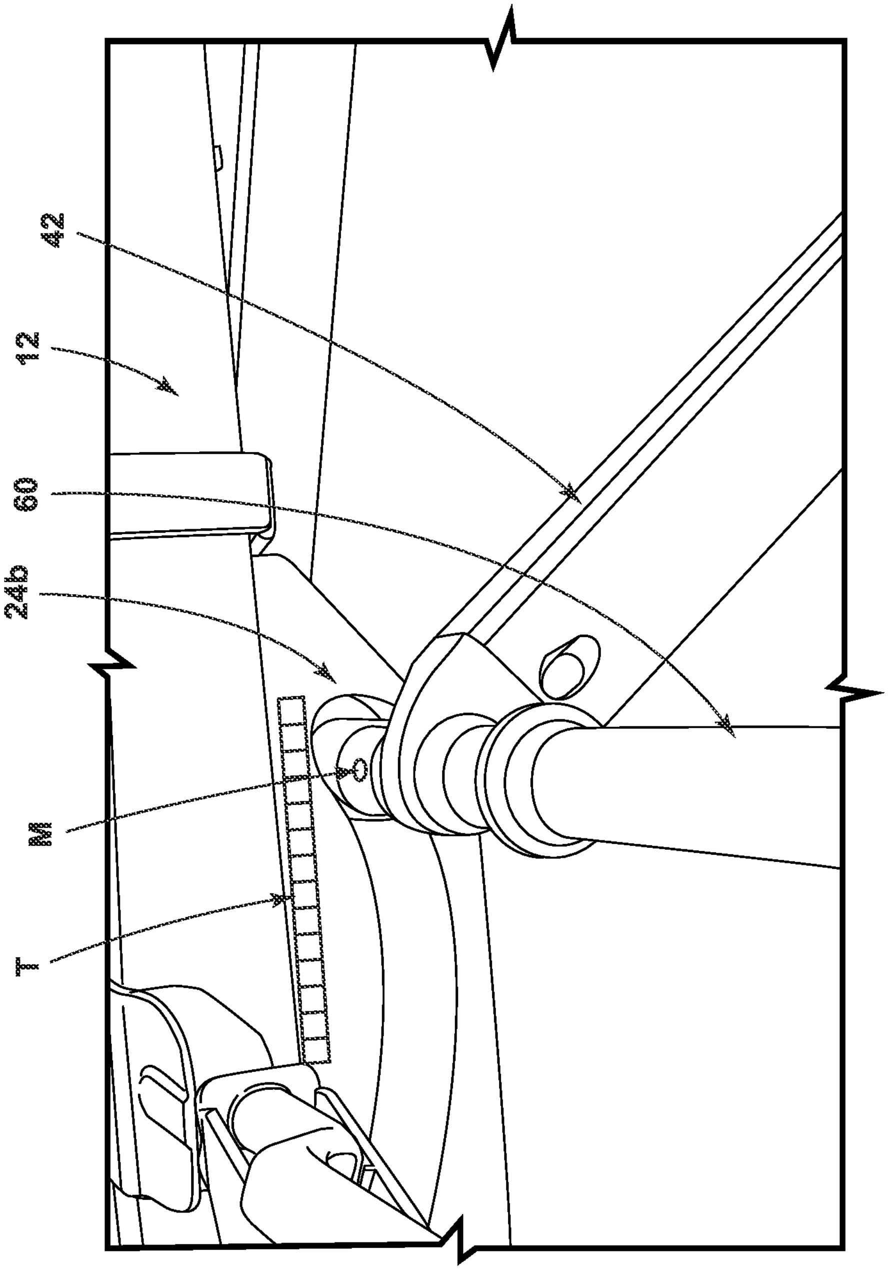
FIG. 1A is an enlarged view of a foot-end upper pivot connection between the lift assembly and the frame.
Figure 4:
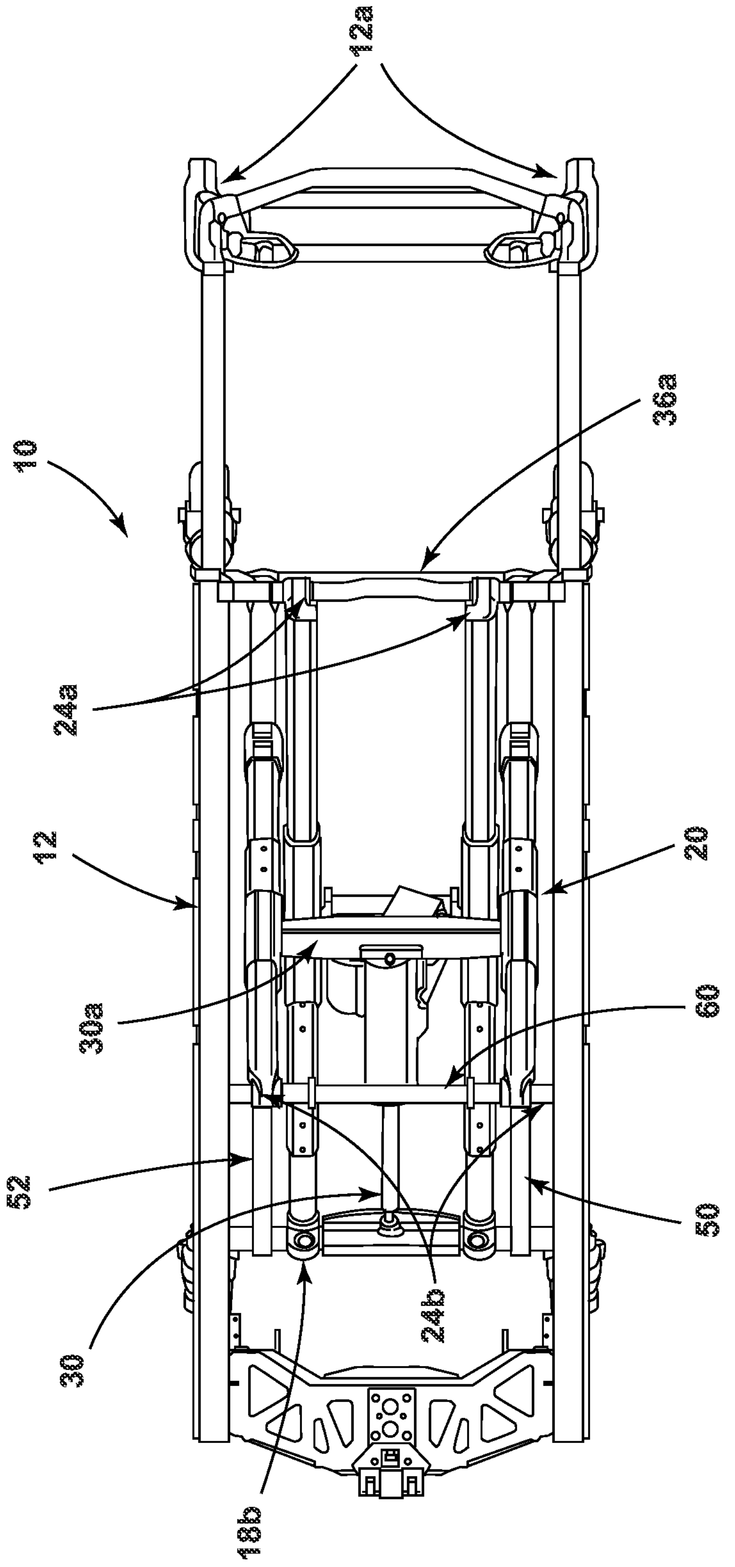
FIG. 4 is a top plan view of the patient handling apparatus of FIG. 3.

For example, in one embodiment, referring to FIG. 1A, an array of transducers T may be attached to the frame 12, and a magnet M mounted, for example, to the foot-end upper pivot connections 24*b*, including for example, to transverse member 60 forming or supporting the foot-end upper pivot connections 24*b* (e.g. FIGS. 2 and 4). The array of transducers T may be mounted to frame 12 adjacent to or incorporated in guide 32 along path P, as partially shown (FIG. 2). In this manner, as the foot-end upper pivot connections 24*b* move along path P (FIG. 2) magnet M (FIG. 1A) will also move along the array of transducers (FIG. 1A), and the magnetic field of the magnet will be detected by one or more of transducers T to create an input signal or signals to the controller 120 that is indicative of the height position of the patient handling apparatus 10. For additional details reference is made to U.S. patent application Ser. No. 15/949,648, entitled. PATIENT HANDLING APPARATUS WITH HYDRAULIC CONTROL SYSTEM filed on Apr. 10, 2018 (P-567A), which is incorporated by reference in its entirety herein. For examples of other suitable sensors that may be used, reference is made to U.S. patent application Ser. No. 16/271,117, which is entitled TECHNIQUES FOR DETERMINING A POSE OF A PATIENT SUPPORT TRANSPORT APPARATUS, filed Feb. 8, 2019, which is incorporated by reference herein in its entirety.

In yet another embodiment, control system 82 may include one or more sensors 126 (FIG. 6) that detect the configuration of the ambulance patient handling apparatus 10. For example, similar to sensor 124 noted above, transducers (see above for list of suitable transducers or sensors) may be placed at different locations about the patient handling apparatus 10 that detect magnets also placed at different locations about the patient handling apparatus 10. In this manner, when a magnet is aligned with the transducer (or one of the transducers), the magnet field will be detected by that transducer, which transducer then generates a signal or signals that indicate that the patient handling apparatus 10 is in a defined configuration or height (associated with the location of that transducer) of the patient handling apparatus 10. The number of configurations may be varied—for example, a single sensor may be provided to detect a single configuration (e.g. fully raised configuration or a fully lowered configuration) or multiple sensors may be used to detect multiple configurations, with each transducer detecting a specific configuration. Again, the sensors can create an appropriate input signal to the controller 120 that is indicative of the configuration of the patient handling apparatus 10. For example of a suitable control system that senses a safe transport height, reference is made to copending U.S. patent application Ser. No. 16/271,114, which is entitled PATIENT TRANSPORT APPARATUS WITH DEFINED TRANSPORT HEIGHT, filed on Feb. 9, 2019, which is incorporated by reference herein in its entirety.

Further, when multiple configurations are detected, controller 120 may compare the detected configuration of patient handling apparatus 10 to a prescribed configuration and, in response, control the hydraulic circuit 90 based on whether the patient handling apparatus 10 is in or near a prescribed configuration or not. Or when only a single configuration is detected, controller 120 may simple use the signal from the sensor as an input signal and control hydraulic circuit 90 based on the input signal.

When the patient handling apparatus 10 is no longer in the prescribed configuration (e.g. by comparing the detected configuration to a prescribed configuration stored in memory or detecting that it is not in a prescribed configuration), controller 120 may be configured to open or reopen the valve 116 to allow cylinder 80 to operate at its increased speed but then close valve 116 when controller 120 detects that patient handling apparatus 10 is in a prescribed configuration and/or, further, may slow or stop the motor to stop the pump or reverse the motor.

For example, one of the prescribed configurations may be when the lift assembly is in its transport or fully raised configuration. In this manner, similar to the previous embodiment, when controller 120 detects that patient handling apparatus 10 is near or in its fully raised configuration, controller 120 may be configured to close valve 116 so that cylinder 80 can no longer be driven at the increased speed, and further may also stop motor 94 to stop pump 92. As noted above, controller 120 may open or close the valve 116 before, after, or at the same time as stopping the pump (or reversing the motor) based on the input signal or signals from or the status of the sensor(s). Alternately, controller 120 may stop the pump 92 in lieu of closing the valve 116 based on an input signal or signals from or the status of the sensor(s).

In yet another embodiment, the control system 82 may include a sensor 128 (FIG. 6), which is in communication with controller 120, to detect when a load on the motor (or on the pump) occurs. For example, sensor 128 may detect current drawn by the motor. In this manner, using sensor 128, controller 12 can detect when the base is supported on a surface, such as the ground or the deck of the emergency vehicle, by detecting when the motor or pump encounter increased resistance, for example, by detecting the current in the motor. As would be understood, this increase resistance would occur when the base 18 is either supported or encounters an obstruction. Further, controller 120 may be configured to detect when the load has exceeded a prescribed value (e.g. by comparing the detected load to a store load value in memory), and optionally close valve 116 to no longer allow fluid communication between the rod end chamber **84*b* and the cap end chamber 84*a* via conduit 112 when the load has exceeded the prescribed value. As noted above, controller 120 may open or close the valve 116 before the load reaches the prescribed value and further before, after, or at the same time as slowing or stopping the pump based on an input signal or signals from or the status of the sensor(s). As noted above, controller may also reverse the motor before, after or at the same time it closes valve 116. Alternately, controller 120 may slow or stop the pump 92 in lieu of closing the valve 116** based on an input signal or signals from or the status of the sensor(s).

So for example, if an attendant is removing patient handling apparatus from an emergency vehicle and has selected the base lowering function, and while the base is being lowered at the increased speed, controller 120 detects that the motor or pump is under an increase in load (e.g. detects an increase in current) (which, as noted, would occur when the base 18 is supported, either by a support surface or an obstruction) controller 120 may close valve 116 so that cylinder 80 will no longer be driven at the increased speed. Optionally, controller 120 may also or instead slow or stop the pump and/or stop the pump before closing the valve. Alternately, controller 120 may simultaneously close the valve 116 and slow or stop the pump. As described above, in yet another embodiment, controller 120 may close the valve 116 prior to base 18 being supported (for example, when the frame 12 or base 18 reaches a prescribed height or when apparatus 10 has a prescribed configuration) and only after controller 120 detects that base 18 has contacted the ground surface and/or the base 18 is fully lowered, controller 120 will stop pump 92 so that cylinder 80 will no longer extend. Or the controller 120 may be configured to stop the pump 92 before the base reaches the ground to avoid overshoot.

The controller 120 may also receive signals indicative of the presence of the patient handling apparatus 10 near an emergency vehicle. For example, a transducer may be mounted to the patient handling apparatus 10, and a magnet may be mounted to the emergency vehicle and located so that when the patient handling apparatus is near the emergency vehicle, the transducer will detect the magnet and generate a signal based on its detection. In this manner, when an operator has selected the base extending (e.g. lowering) function and controller 120 detects that patient handling apparatus 10 is near an emergency vehicle and, further, detects one or more of the other conditions above (e.g. that the base is not contacting a support surface or there is no load on the motor or pump or the patient handling apparatus 10 is not in a prescribed configuration), controller 120 may open valve 116 to allow the cylinder to be driven at the increased speed. In this manner, these additional input signals may confirm that the situation is consistent with a third mode operation.

Alternately, controller 120 may also receive signals indicative of the presence of the patient handling apparatus 10 in an emergency vehicle. For example, a transducer may be mounted to the patient handling apparatus 10, and a magnet may be mounted to the emergency vehicle and located so that when the patient handling apparatus is in the emergency vehicle, the transducer will detect the magnet and generate a signal based on its detection. In this manner, when an operator has selected the base lowering function and controller 12 detects that patient handling apparatus 10 is in the emergency vehicle and detects one or more of the other conditions above (e.g. that the base is not contacting a support surface or there is no load on the motor or pump or the patient handling apparatus 10 is not in a prescribed configuration), the signal indicating that patient handling apparatus 10 is in the emergency vehicle will override the detection of the other conditions and the controller 120 may maintain valve 116 closed to prevent the cylinder from being driven at the increased speed and, further, override the input signal generated by the operator. For further details of sensing the proximity to or location in an emergency vehicle, reference is made to U.S. patent application Ser. No. 14/998,028, entitled PATIENT SUPPORT, filed on Jul. 7, 2014 (P-433A), which is incorporated by reference in its entirety herein.

In yet another embodiment, the patient handling apparatus 10 may include a patient handling apparatus-based communication system 130 (FIG. 6) for communicating with a loading and unloading based communication system 132 (FIG. 6) on a loading and unloading apparatus. For example, the communication systems 130, 132 may be wireless, such as RF communication systems (including near-field communication systems). For example, the control system 82 may be operable to open or close the valve 116 based on a signal received from the loading and unloading based communication system 132. In this manner, the deployment of the base of the patient handling apparatus 10 may be controlled by someone at the loading and unloading apparatus or someone controlling the loading and unloading apparatus.

In one embodiment, rather than allowing controller 120 to start in the third mode (when all the conditions are satisfied), controller 120 may be configured initially start the base lowering function in the first mode, where the base is lowered at the slower, first speed. Only after controller 120 has checked that there is a change in the load (e.g. by checking a sensor, for example a load cell or current sensing sensor) on the motor or cot to confirm that the motor or pump are now under a load (which would occur once the apparatus is pulled from the emergency vehicle and the base is being lowered), does controller 120 then switch to the third mode to operate the cylinder at the faster, second speed. Again, once operating in the third mode, should controller 120 detect one or more of the conditions noted above (base 18 is supported or encounters an obstruction, the height exceeds a prescribed height, the configuration is in a prescribed configuration, the load on the motor or pump exceeds a prescribed value) controller 120 will close valve 116 and optionally further slow or stop pump. As noted above, the valve 116 may be closed by controller 120 after the pump 92 is slowed or stopped or simultaneously.

In any of the above embodiments, it should be understood that control system 82 can control hydraulic circuit 90 to slow or stop the extension of rod 86 of cylinder, using any of the methods described above, before the conditions noted above, such as before reaching a predetermined height, before reaching a predetermined configuration, before making contact with the ground or an obstruction, or before reaching a prescribed load on the motor etc. Further, control of the fluid through the hydraulic circuit may be achieved by controlling the flow rate or opening or closing the flow using the various valves noted above that are shown and/or described. Further, as noted to avoid excess pressure in the hydraulic circuit, controller 120 may reverse the motor when controlling the valves described herein or may slow or stop the motor and pump before reaching the target (e.g. maximum height). Additionally, also as noted, controller 120 may control the hydraulic circuit by (1) adjusting the flow control valves or valves (e.g. valve 116), (2) adjusting the pump 92 (slow down or stop) or 3) adjusting both the flow control valves or valves (e.g. valve 116) and the pump, in any sequence.

Further, it should be understood, in each instance above, where it is described that the controller or sensor or other components are in communication, it should be understand that the communication may be achieved through hard wiring or via wireless communication. Further, although illustrated as discrete separate components, the various components may be assembled or integrated together into a single unit or multiple units.

Optionally, described more fully below, hydraulic circuit 90 may instead, or in addition, incorporate a hydraulic based logic component that is configured to generate a pilot signal to control another hydraulic component, such as a valve, based on flow through the hydraulic based logic component. For example, as will be described, when the flow of fluid through the hydraulic based logic component reaches a threshold value, the hydraulic based logic component will generate a pilot signal to open a pilot operated valve to divert the flow of fluid away from another hydraulic component to avoid over pressurizing or simply change the logic of the hydraulic circuit.

As noted above, the frame 12 is optionally configured to allow the frame 12 to be tilted relative to the lift assembly 20 so that one end (e.g. head-end or foot-end) of the frame 12 can be raised beyond the fully raised height of the lift assembly to allow the patient handling apparatus to be inserted more easily into the compartment of an emergency vehicle. In addition, the frame 12 can be tilted without decoupling the frame 12 from the lift assembly 20.

In the illustrated embodiment, movable foot-end upper pivot connections **24*b* are configured so that they can move in a direction angled (e.g. oblique (acute or obtuse) or even perpendicular) relative to the longitudinal axis 12*b* of the frame 12 and optionally along or relative to the longitudinal axis 12*b* (FIG. 1) of the frame 12. In this manner, the movable foot-end upper pivot connections 24*b* follow a non-linear path P that takes them toward or away from the longitudinal axis 12*b* of the frame 12 over at least a portion of the range of motion of the movable foot-end upper pivot connections 24*b* to cause the frame 12 to tilt relative to the lift assembly 20** (as opposed to being tilted by the lift assembly).

Referring to FIGS. 1 and 2, this range of motion where the frame 12 tilts may be at one end of the range of motion of the foot-end upper pivot connections **24*b* and, for example, where lift assembly 20 is raised to its maximum height or may be intermediate the ends of path P. Further, after lift assembly 20 has raised frame 12 to its maximum raised height (see FIG. 2), frame 12 may be tilted further to raise the head-end of the frame 12 so that head-end wheel 12*a*** can be raised sufficiently to rest on the litter frame of an emergence vehicle compartment.

Referring again to FIG. 1, movable foot-end upper pivot connections **24*b* are mounted to frame 12 by guides 32. Guides 32 form a non-linear guide path P (FIGS. 1-5) ("non-linear path" means a path that does not form a straight line) for the movable foot-end upper pivot connections 24*b*. While guide path P is non-linear, path P may include one or more linear sections and one or more non-linear sections, such as arcuate sections. In the illustrated embodiment, guides 32 provide a non-linear guide path P with one linear section that corresponds to the lowered height (FIG. 3) of the lift assembly 20 where movable foot-end upper pivot connections 24*b* are at their lowest height and lift assembly 20 is in its folded, most compact configuration. The path P of each guide 32 also includes an arcuate section, which is the adjacent linear section and may have a single radius of curvature or two or more radii of curvatures. Further, the arcuate section may have two portions, with a first portion corresponding to the fully raised height of lift assembly 20 and a second portion corresponding to the fully raised height of lift assembly 20, but with the frame 12 tilted further (FIG. 2**).

Thus, when lift assembly 20 starts in its lowermost position and is extended, movable foot-end upper pivot connections **24*b* move along guide path P from one end (which corresponds to the lowermost position of lift assembly 20) where the movement of movable foot-end upper pivot connections 24*b* is generally linear (and parallel to longitudinal axis 12*b* of frame 12) to a non-linear portion of path P, which corresponds to a raised position of lift assembly. As lift assembly 20 continues to extend and raise frame 12 further, movable foot-end upper pivot connections 24*b* continue to move along non-linear path P (FIG. 2) and initially move further away from longitudinal axis 12*b* (while still moving relative or along longitudinal axis 12*b*). During this movement, frame 12 remains substantially horizontal. As lift assembly 20 continues to extend to its fully raised position, movable foot-end upper pivot connections 24***b* continue to move along the non-linear portion of path P and, further, continue to move away from longitudinal axis 12*b*. This movement is then followed by movable foot-end upper pivot connections 24*b* moving toward longitudinal axis 12*b* where frame 12 tilts upwardly (FIG. 1). It should be understood that the positions of load bearing members 22 and movable foot-end upper pivot connections 24*b* are controlled and "locked" in their positions by the hydraulic cylinder. In order to further tilt frame 12 upwardly from its position shown in FIG. 1 to its position shown in FIG. 2, a downward force is applied to the foot-end of the litter, which causes movable foot-end upper pivot connections 24*b* to move toward the end of path P and move further towards longitudinal axis 12*b*, which causes frame 12 to further tilt upwardly. Because the position of foot-end upper pivot connections 24*b* is essentially locked in its position shown in FIG. 1, only an external force will cause upper pivot connections 24*b* to move to the end of path P as shown in FIG. 2. As noted this external force may simply be manually applied by an attendant (e.g. an EMS person) at the foot-end of the litter- or it may be applied by an actuator.

As best seen in FIG. 6, foot-end upper pivot connections 24*b* are supported on or formed by a transverse member 60, which is mounted to the upper ends of telescoping members 42 by a rigid connection. In the illustrated embodiment, foot-end upper pivot connections 24*b* are formed by the ends of transverse member 60. For example, transverse member 60 may comprise a tubular member or solid bar with a circular cross-section. To accommodate the rotation of each telescoping member 42 (as lift assembly is extended or retracted) and allow each telescoping member 42 at the foot-end to pivot and translate along guide path P, foot-end upper pivot connections 24*b* optionally each include a roller. The rollers are mounted about the respective ends of transverse member 60 and guided along guide paths P of guides 32. For example, the rollers may each comprise a low friction collar, such as a high density polyethylene collar, or a bearing assembly, which is free to rotate about the end of tubular member and further, as noted, roll along guide path P. Alternately, foot-end upper pivot connections 24*b* may be configured to slide along path P.

In the illustrated embodiment, guides 32 are each formed from a low friction member or plate, such as a high density polyethylene plate, mounted to frame 12. Each low friction member or plate 72 includes a recess formed therein, which forms guide path P. Alternately, guide 32 may be formed from a metal member or plate with the recess formed therein lined with a low friction material, such as high density polyethylene.

In this manner, pivot connections 26*b* allows telescoping members 42 to pivot about a moving horizontal axis (i.e. moving horizontal axis of transverse member 60) (moving both in the longitudinal direction and/or vertical direction, as noted above, namely along longitudinal axis 12*a* or toward or away from longitudinal axis 12*a*) and, further, allow lift assembly 20 to adjust the height of frame 12 relative to base 18.

In addition, referring again to FIG. 2, frame 12 includes a pair of side frame members 14*a* and 14*b*, which are interconnected by cross or transverse frame members 36*a* (only one shown). Cross-frame member 36*a* provides a mounting point for the head-end load bearing members 22 of lift assembly 20. In addition, side frame members 14*a* and 14*b* may provide a mounting surface for collapsible side rails (not shown).

For further details of frame 12, telescoping members 44, base 18, brackets 54 and 56, linkage members 50 and 52, and a catch mechanism, and other components not specifically mentioned or described herein, or for alternate embodiments of components described herein, reference is made to U.S. Pat. Nos. 5,537,700 and 7,398,571, and published Application No. WO 2007/123571, commonly owned by Stryker Corporation, which are herein incorporated by reference in their entireties.

Thus, when the ambulance patient handling apparatus is in the fully collapsed position or loading configuration, and referring to FIG. 4, an extension of the linear actuator 30 will cause a clockwise (FIG. 4) rotation of the brackets 54, 56 about the axis of fasteners 55. Fasteners 55 secure the upper end of linkage members 50, 52 to X-frames 44. As a result of this geometry, the force in the direction of the extension of linear actuator 30 effects a rapid lifting of the frame 12 to the transport configuration or the full height position of the lift assembly illustrated in FIGS. 1 and 2.

For further optional details on how lift assembly 20 is mounted to frame 12, reference is made to copending U.S. application Ser. No. 15/949,624, entitled EMERGENCY COT WITH A LITTER HEIGHT ADJUSTMENT MECHANISM, and filed on Apr. 10, 2018, which is incorporated herein by reference in its entirety. For other examples of suitable lift assemblies, including their mounting arrangements, reference is made to U.S. Pat. Nos. 7,398,571 and 9,486,373, which are commonly owned by Stryker Corp. of Kalamazoo, MI and incorporated herein by reference in their entireties.

Optionally, as noted above, hydraulic circuit 90 may incorporate a hydraulic based logic component that is configured to generate a pilot signal to control another hydraulic component, such as a valve, based on flow through the hydraulic based logic component. In one embodiment, a single hydraulic based logic component, in the form of a flow based pilot valve (194, described below), is employed, but in other embodiments, two or more hydraulic based logic components may be used in series or parallel or a combination of both to achieve the desired logic.

In the illustrated embodiment, hydraulic circuit 90 includes hydraulic circuit 190 that is configured to assist in reducing the pressure on the cap side of the hydraulic cylinder when the hydraulic cylinder is being retracted rapidly, especially when the hydraulic cylinder is not loaded, e.g. when the base is not supporting the patient handling apparatus on a floor or ground surface.

Figure 9:
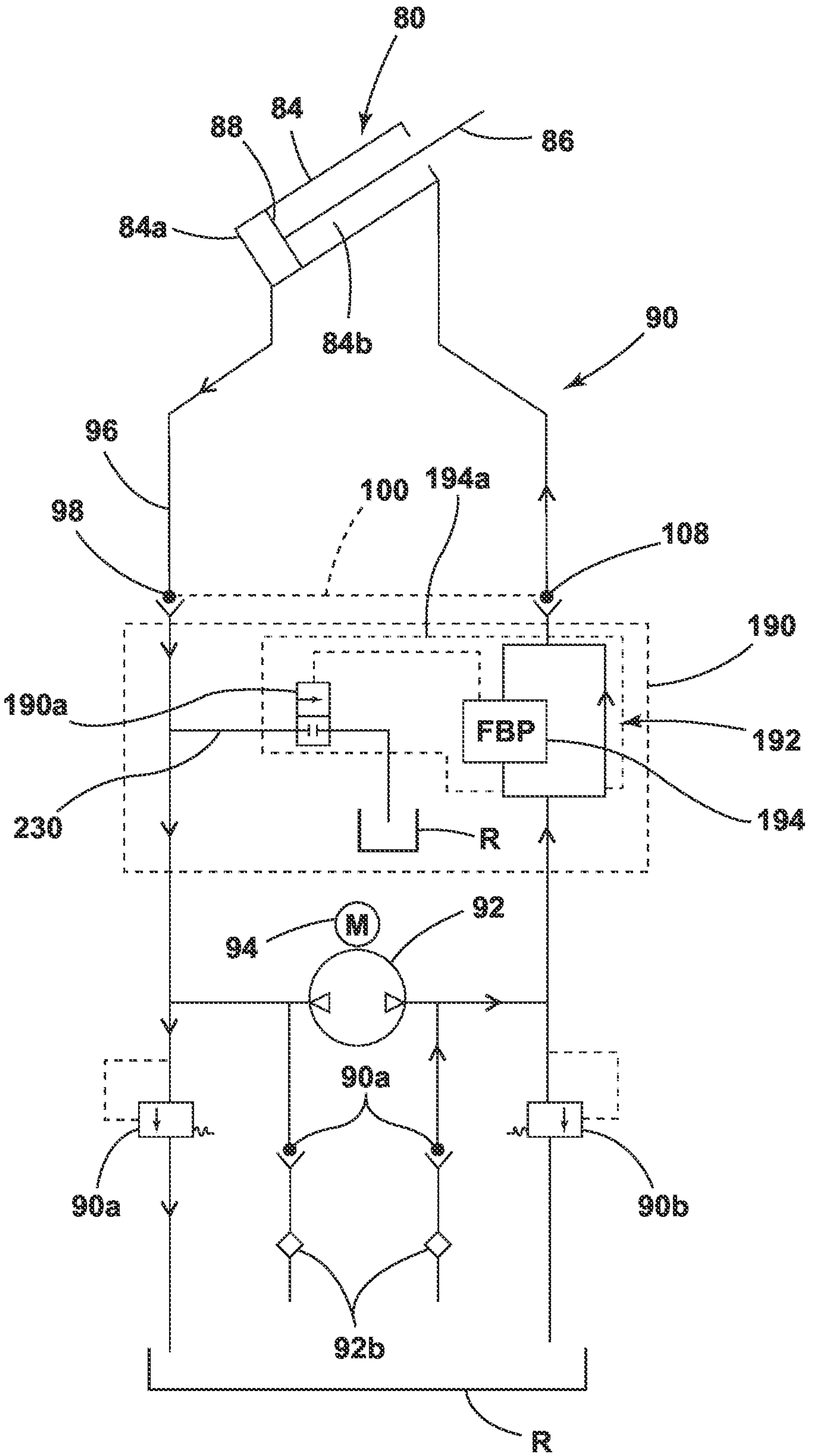
FIG. 9 is a hydraulic circuit diagram of another hydraulic circuit that may be used in the hydraulic circuit shown in FIG. 6 illustrating the flow of fluid during lowering of the frame relative to the base in a low flow condition when the base is supported on a ground surface or raising of the base when the frame is supported in a low flow condition.
Figure 10:
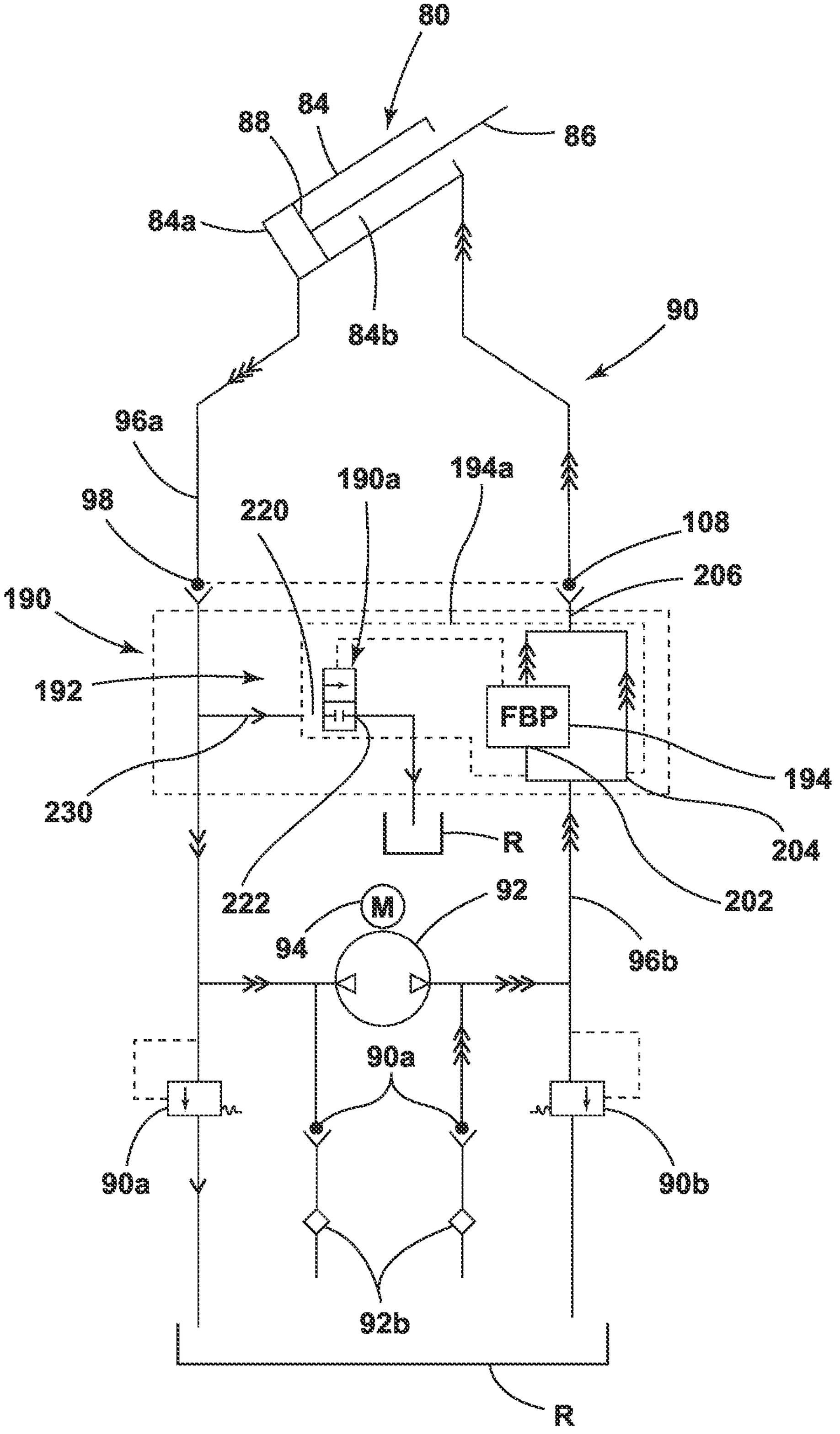
FIG. 10 is similar view to FIG. 9 illustrating the flow of fluid during a rapid raising or retracting of the base when the base is unsupported, for example, during loading of the patient handling apparatus or rapid lowering of the frame when the base is supported.
Figure 11:
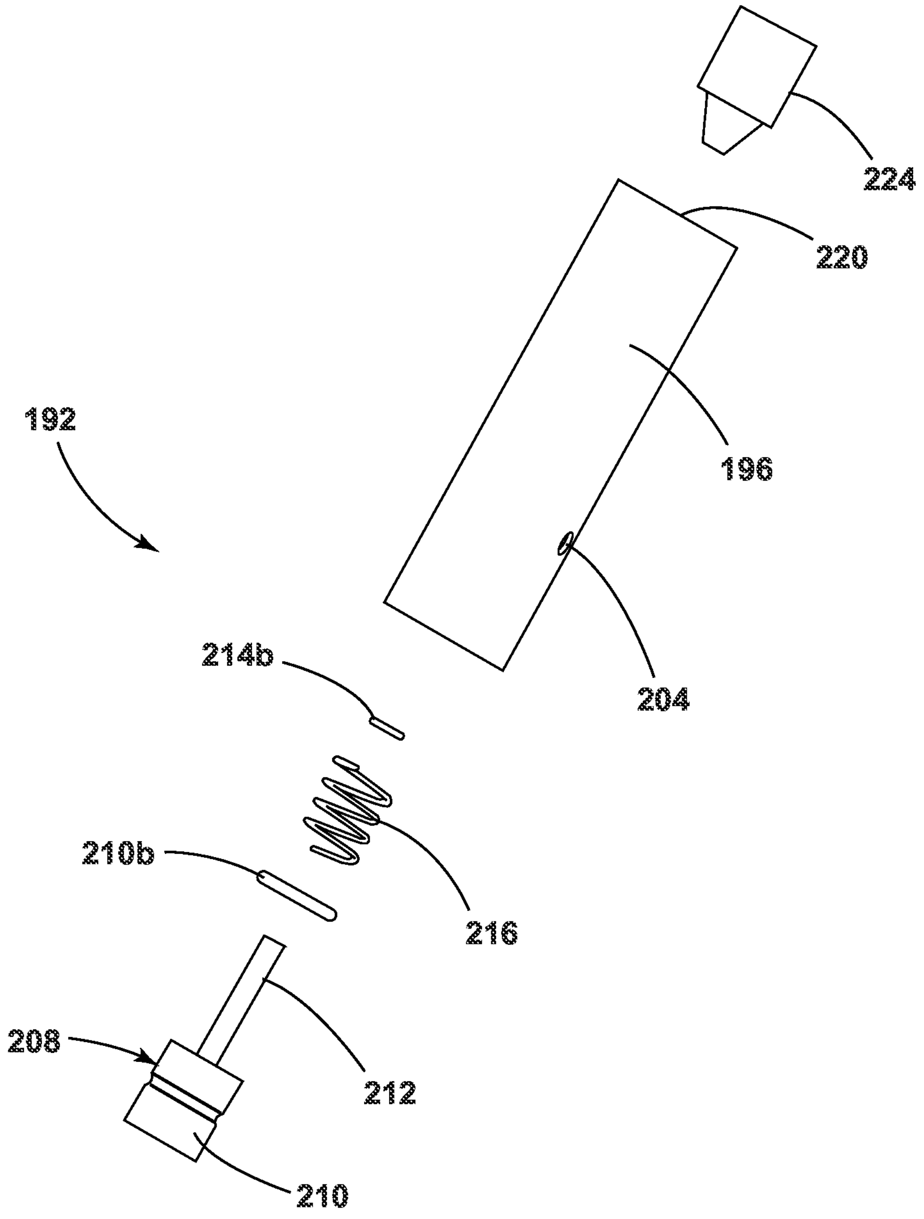
FIG. 11 is an exploded perspective view of a pilot operated control valve of the hydraulic circuit of FIG. 9.
Figure 12:
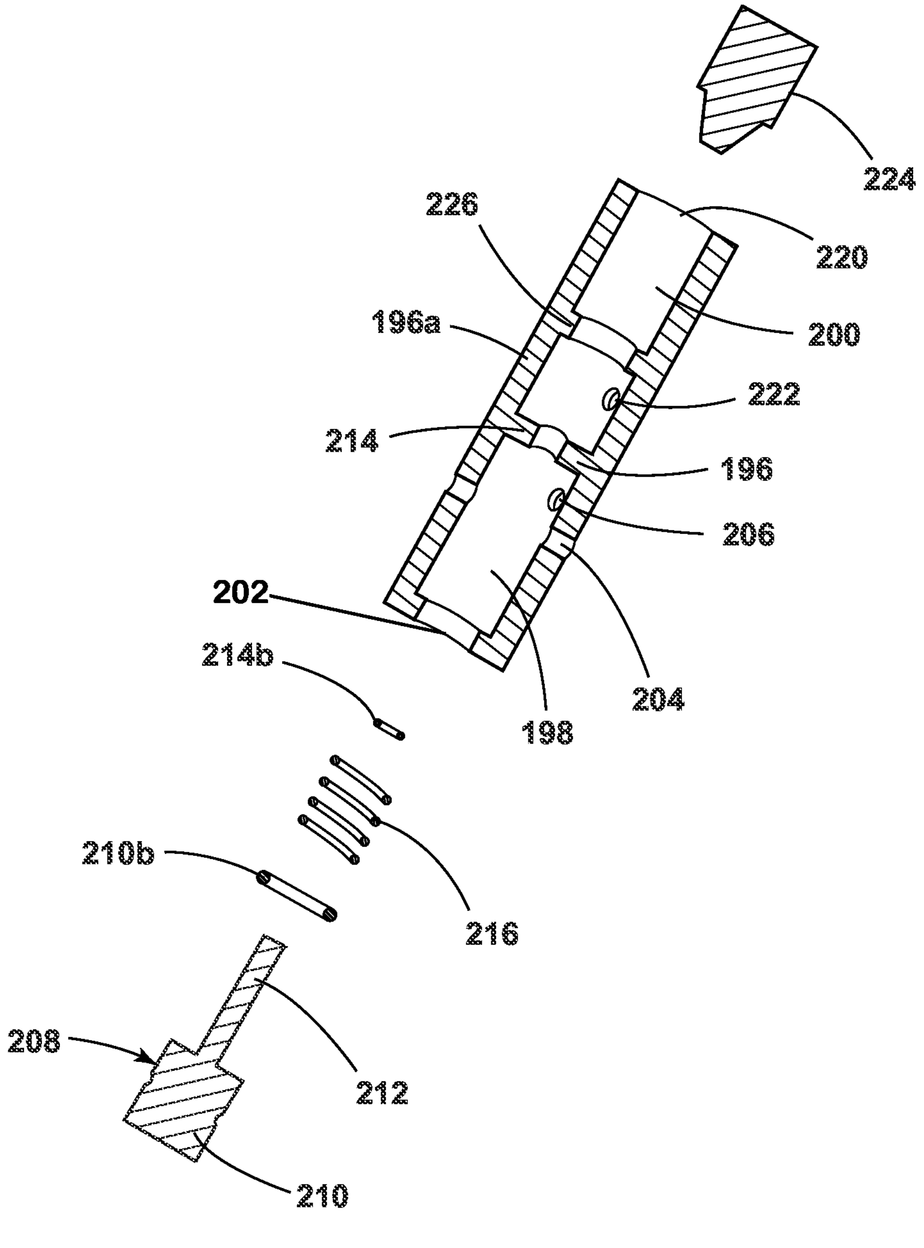
FIG. 12 is an exploded cross-sectional view of the pilot operated control valve of FIG. 11.

Referring to FIGS. 9-10, hydraulic circuit 190 is configured to evacuate the hydraulic fluid from and thereby reduce the pressure on, for example, the cap side of the hydraulic cylinder 80 during a rapid retract of the hydraulic cylinder 80, especially when the hydraulic cylinder 80 is not loaded. Or stated another way, hydraulic circuit 190 may be used for redirecting some of the fluid discharged from the cap end of the hydraulic cylinder at a faster rate (to speed up the discharge) to allow the retraction speed of the rod to be increased. Further, hydraulic circuit 90 may incorporate hydraulic circuit 190 without the use of the redirect hydraulic circuit (e.g. conduit 112, check valve 114, solenoid valve 116) that redirects some of the output from the rod end chamber 84*b* to the end cap chamber 84*a*.

Referring again to FIGS. 9 and 10, hydraulic circuit 190 may be located between the check valves 98, 108 and pump 92 and includes a pilot operated flow control valve assembly 192 (note in this figure some components of circuit 90 have been omitted, for example, the redirect hydraulic circuit) with a flow based pilot valve 194 to selectively open a pilot operated valve 190*a*, which is normally closed to the cap side of the cylinder and the reservoir but when open allows fluid from the cap side of the cylinder 84 to be in fluid communication with the reservoir. Flow control valve assembly 192 is always open and in fluid communication with pilot operated check valve 108. When the flow rate of hydraulic fluid flowing through valve 194 (fluid flowing to the rod end chamber 84*b* of hydraulic cylinder 84) reaches a threshold value, pilot valve 194 is configured to open pilot operated valve 190*a* to allow at least some of the fluid evacuated or discharged from cap end chamber 84*a* to flow to reservoir R.

For example, hydraulic cylinder 80 typically has a 2:1 rod differential, so that the flow out of the cap end chamber is about twice that of the rate of fluid flow into the rod end chamber. Therefore, when you want to retract the rod at a rapid rate, the rate of fluid flow out of the cap end, which is double the rod end rate, can create some back pressure on the cylinder and/or increased pressure on the pump, which can limit the speed of the rod. Therefore, by redirecting some of the fluid to reservoir R, the pressure on the cylinder and/or the pump can be reduced and, hence, the speed of the rod can be increased without the stress normally associated with such a rapid retract. Thus, instead of being cycled through the pump, the fluid may be able to go straight to the reservoir, which provides a faster path (path of lower resistance) to achieve the circuit completion. In the illustrated embodiment, the switching is "hydraulic switching" and may be all internal to the hydraulics using the flow in the hydraulic circuit and through the hydraulic based logic component, such as the flow based pilot valve described herein. Optionally, this hydraulic switching may be combined with control system logic based on input from a sensor, such as a weight sensor or position sensor (either internal or external), such as described in copending application entitled HYDRAULIC CIRCUIT FOR A PATIENT HANDLING APPARATUS, filed on even date herewith by Stryker Corp., which is incorporated by reference herein in its entirety.

Referring again to FIGS. 11-15, pilot operated control valve assembly 192 includes a valve body 196, such as a cylindrical body, which forms or includes a first chamber 198 and a second chamber 200 (FIGS. 12-15). First chamber 198 forms the flow based pilot valve 194. Second chamber 200 forms pilot operated valve 190*a*.

Figure 14:
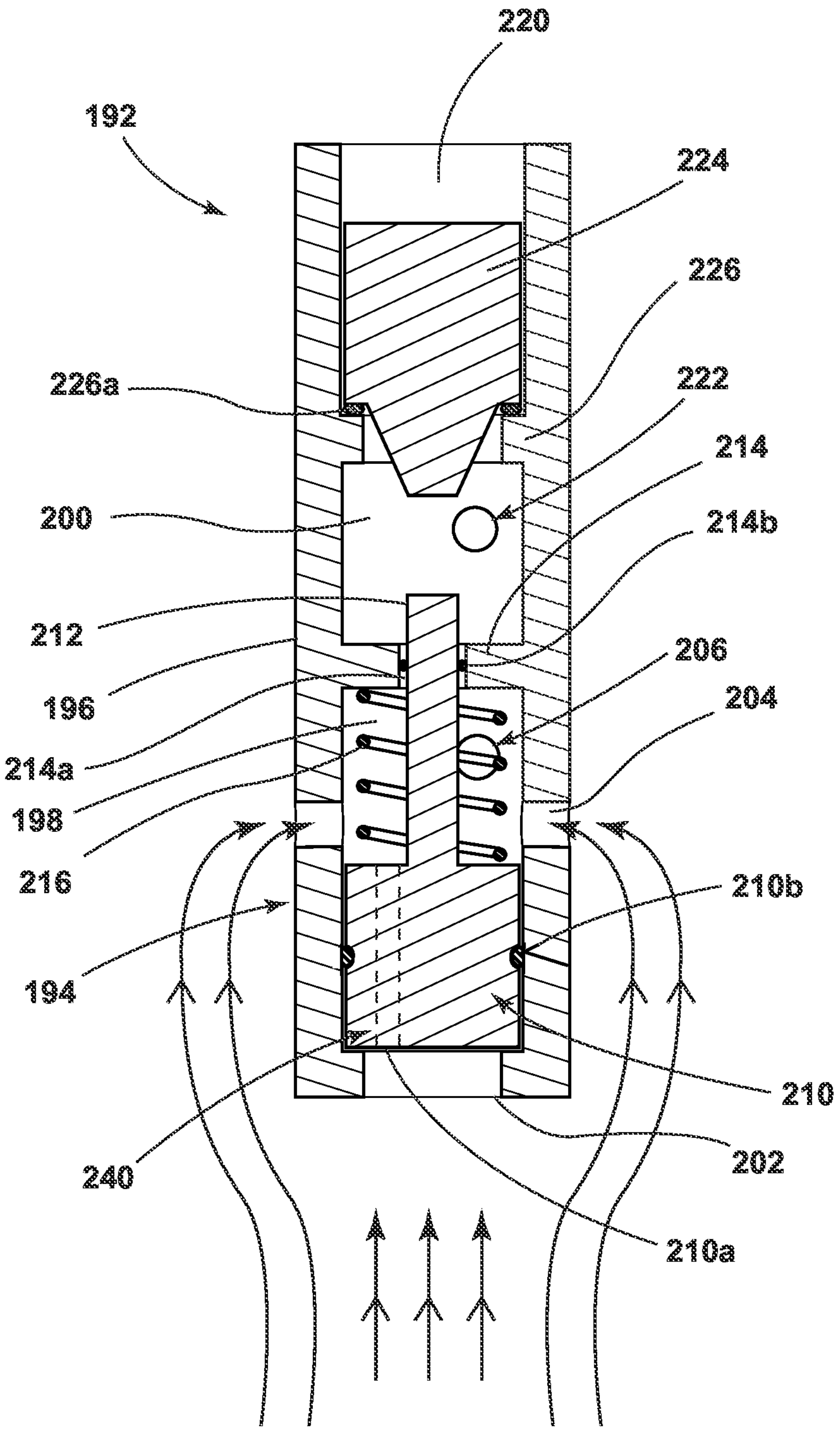
FIG. 14 is a schematic cross-sectional view of the pilot operated control valve of FIGS. 11-13 illustrating the flow through the pilot valve in a low flow condition.
Figure 15:
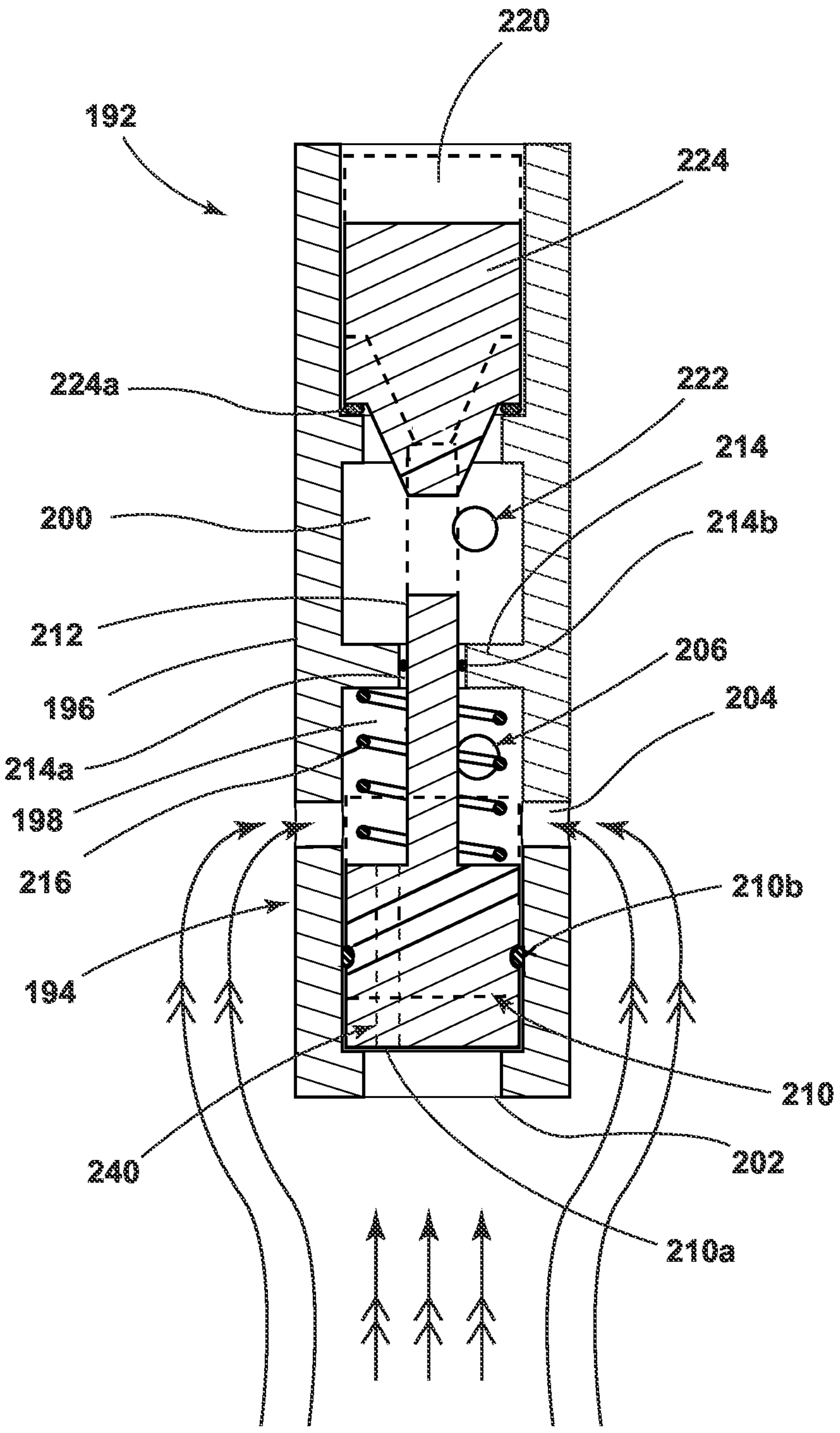
FIG. 15 is a schematic cross-sectional view of the pilot operated control valve of FIGS. 11-13 illustrating the flow through the pilot valve in a high flow condition.

First chamber 198 includes a first inlet 202, a second inlet 204, an outlet 206, and a pilot piston assembly 208 mounted for movement in the first chamber 198 between a closed position (e.g. FIGS. 13 and 14) and an open position (FIG. 15—shown in dashed lines). First inlet 202 of first chamber 198 is in fluid communication with the conduit 96*b* that directs hydraulic fluid to or from the pump 92 (on the rod side of the cylinder). Second inlet 204 is also in fluid communication with the conduit 96*b* that directs hydraulic fluid to or from the pump 92. Outlet 206 is in fluid communication with the conduit that directs the flow of hydraulic fluid to or from the rod end chamber 84*b* of hydraulic cylinder 80 via pilot operate check valve 108.

Figure 13:
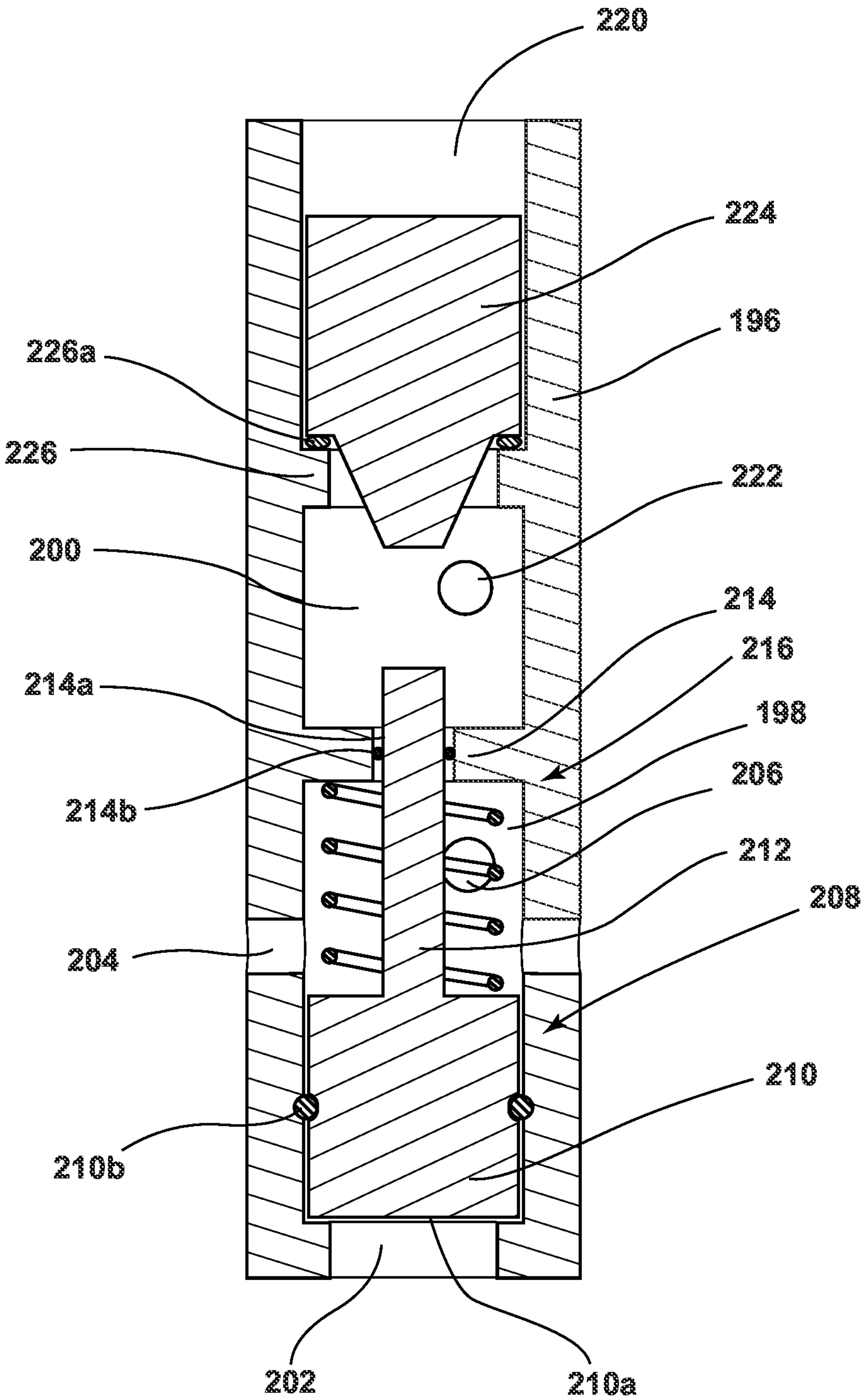
FIG. 13 is a cross-sectional view of the pilot operated control valve.

The pilot piston assembly 208 includes a pilot piston 210 with a piston side 210*a* (FIG. 13) facing the first inlet 202 and a pilot rod 212 that extends from the first chamber 198 into second chamber 200 and is sealed against the inner wall of first chamber 198 by an annular seal 210*b*. Pilot rod 212 extends into second chamber 200 through a passageway 214*a* formed in a wall 214, which may be formed by a shoulder in valve body 196, that separates the first chamber 198 from the second chamber 200. Located in passageway 214*a* is an annular seal 214*b*, which seals against rod 212 to seal the second chamber 200 from the first chamber 198. Piston assembly 208 is biased to its closed position (such as shown in FIGS. 13 and 14) by a spring 216, such as a coil spring, which extends between wall 214 and piston 210.

Second inlet 204 is in fluid communication with the first chamber 198 and outlet 206 of the first chamber 198 regardless of the position of the piston assembly 208 so that fluid flows from the outlet 206 of the first chamber 198 during all fluid flow conditions-during low flow conditions and high flow conditions. In this manner, hydraulic fluid flows through the pilot operated control valve assembly 192 during all flow conditions.

Rapid retraction of rod 212 may be desirable as noted above, for example, when the base of patient handling apparatus 10 is unsupported, and when the patient handling apparatus 10 is being loaded into an emergency vehicle.

Second chamber 200 includes an inlet 220, an outlet 222, for example, formed by a low pressure bypass (LB) orifice, which is in fluid communication with reservoir R, and a valve poppet 224. Inlet 220 of second chamber 200 is in fluid communication with a conduit 230 (FIGS. 9 and 10) that is in fluid communication with conduit 96, which directs hydraulic fluid to or from cap end chamber 84*a* of hydraulic cylinder 80.

Valve poppet 224 is movably mounted in the second chamber between a closed position (shown in FIGS. 13 and 14) wherein valve poppet 224 is seated on a valve seat 226 (FIG. 14) and one or more open positions (shown in dashed lines in FIG. 15) wherein valve poppet 224 moves off seat 226. Valve seat 226 includes an annular seal 226*a* to seal the inlet 220 of the second chamber from fluid communication with the outlet 222 of the second chamber when valve poppet 224 is in its closed position. When valve poppet 224 is moved off the seat 226, inlet 220 of the second chamber 200 is in fluid communication with the outlet 222 of the second chamber 200 (thereby opening pilot operated valve 190*a*), which as described below allows at least some of the fluid discharged or evacuated from the cap end of hydraulic cylinder 80 to be discharged to reservoir R from conduits 96 and 230.

When the fluid flow to the first inlet 202 of the first chamber 198 exceeds a preselected flow rate, back pressure at the inlet 202 of the first chamber 198 will move the pilot piston 210 from its closed position to an open position (shown in dashed lines in FIG. 15). This will cause the pilot rod 212 to move the valve poppet 224 from its closed position to one of its open positions to allow fluid flow from the conduit 230 into inlet 220 of the second chamber 200 and to the outlet 222 of the second chamber 200, which is in fluid communication with reservoir R. In this manner, when the flow of hydraulic fluid pumped from pump 92 to rod end chamber 84*b* of hydraulic cylinder 80 exceeds a threshold flow rate, at least some of the fluid flow from cap end chamber 84*a* of hydraulic cylinder 80 can be discharged to reservoir R, which reduces the pressure in the hydraulic cylinder, especially in the cap side of cylinder 80 where pressure may exceed the normal operating pressure during retraction when the cylinder is unloaded. It also allows, more importantly, the cylinder to contract at a faster rate by reducing the resistant on the cap side of the hydraulic cylinder.

In the illustrated embodiment, referring again to FIG. 12, the second inlet 204 of first chamber 198 is formed in the valve body wall 196*a* of valve body 196 so that the fluid flow bypasses the pilot piston assembly. For example, the second inlet may be formed by two or more orifices formed in the valve body wall 196*a*. Thus, when hydraulic fluid is flowing through circuit 90 from pump 92 to rod end chamber 84*b* of hydraulic cylinder 80 during a low flow condition, such as when the hydraulic cylinder 80 is being retracted while the patient handling apparatus base is supported on a floor or ground surface (when the cylinder lowers the frame (and deck) of the patient handling apparatus), pilot valve 194 will allow the hydraulic fluid to flow through the pilot valve but without moving the pilot valve piston. Although illustrated in the side wall section of the valve body wall, the second inlet may be formed in a bottom wall section of the valve body wall 196*a*. Additionally or alternately, another inlet or the second inlet may be formed by a passageway 240 (FIGS. 14 and 15) through pilot piston 210.

Thus, pilot valve 194 provides a flow base pilot valve to control the opening or closing of pilot operated valve 190*a*, which redirects some of the fluid from the cap end of the hydraulic cylinder 80 to the reservoir and thereby reduces the pressure in the hydraulic circuit (e.g. and its components) and the pump and, further, enables the speed of the rod to be increased.

For example, when the cot is not loaded and the operator wishes to speed up the retraction of the base (for example, when the frame is supported by the deck of an emergency vehicle as described in the above), the higher flow of the fluid through flow based pilot valve, may cause flow based pilot valve 194 to generate the pilot signal 194*a* (caused by movement of the valve poppet 224 described above) will open pilot operated valve 190*a* of pilot operated control valve assembly 192 to allow fluid from the cap side of cylinder 84 to go straight to the reservoir (FIG. 10).

In another example, when the cot is loaded with a patient and the operator wishes to lift the frame, the motor will have to drive the pump at a higher speed than when unloaded due to the force need to lift the frame. Flow based pilot valve 194 may be configured to generate the pilot signal when simply raising the frame when it is loaded with a patient (or when a patient has a certain threshold weight) and thereby open the pilot operate valve 190*a* to reduce pressure on the cap side of the cylinder and the pump due to the increase discharge from the cap side of the cylinder. It should be understood that the threshold valve that triggers the pilot signal may be varied and is controlled by the spring constant of spring 216.

As noted, the pilot signal may be generated at high flow conditions, for example, flow rates that are used for a rapid retraction of rod 212, or for increased rates associated with raising the frame when the apparatus is loaded with a patient. For an ambulance cot designed to carry an adult person and that uses a single cylinder to raise or lower the frame (or retract or lower the base), an example of a low flow rate on the rod side may include a rate in a range of about 0.5 to 1.3 liters/min (1/m) or in a range of about 0.70 to 1.0 liters/minute or in a range of about 0.80 to 0.90 liters/minute. Similarly for an ambulance cot designed to carry an adult person and that uses a single cylinder to raise or lower the frame (or retract or lower the base), an example of a high flow rate on the rod side may include a rate in a range of about 2.0 to 3.0 liters/min (1/m) or in a range of about 2.3 to 2.7 liters/minute or in a range of about 2.40 to 2.6 liters/minute. For the cap side, the flow rate ranges would be approximately double that of the rod side.

Although described in the context of a hydraulic control system for a patient support apparatus, the hydraulic based logic component may be used in other applications and to provide logic for other pilot controlled hydraulic devices to achieve the desired logic in a variety of hydraulic systems.

The terms "head-end" and "foot-end" used herein are location reference terms and are used broadly to refer to the location of the cot that is closer to the portion of the cot that supports a head of a person and the portion of the cot that supports the feet of a person, respectively, and should not be construed to mean the very ends or distal ends of the cot.

While several forms of the cot and hydraulic circuit have been shown and described, other forms will now be apparent to those skilled in the art. For example, one or more of the features of the cot 10 may be incorporated into other cots. Similarly, other features form other cots may be incorporated into cot 10. Examples of other cots that may incorporate one or more of the features described herein or which have features that may be incorporated herein are described in U.S. Pat. Nos. 7,100,224; 5,537,700; 6,701,545; 6,526,611; 6,389,623; and 4,767,148, and U.S. Publication Nos. 2005/0241063 and 2006/0075558, which are all incorporated by reference herein in their entireties. Therefore, it will be understood that the embodiments shown in the drawings and described above are merely for illustrative purposes, and are not intended to limit the scope of the invention, which is defined by the claims which follow as interpreted under the principles of patent law including the doctrine of equivalents.

The invention claimed is:

1. An apparatus comprising:

a hydraulic circuit, said hydraulic circuit having a first conduit, a second conduit, a third conduit, and a valve assembly; and said hydraulic circuit configured to selectively open said valve assembly to open communication with said third conduit of said hydraulic circuit based on the flow of the hydraulic fluid in said first conduit when the flow of hydraulic fluid in said first conduit exceeds a selected threshold but to maintain the said valve assembly open between said first conduit and said second conduit so that fluid flows between said first conduit and said second conduit during operational fluid flow conditions.

2. The apparatus according to claim 1, wherein said valve assembly includes a first inlet and a second inlet, each of said first and second inlets being in fluid communication with said first conduit, said valve assembly further includes a first outlet in communication with said second conduit, a third inlet in communication with said third conduit and a second outlet, wherein said valve assembly is configured to selectively open communication between said third conduit and said second outlet based on the flow of the hydraulic fluid in said first conduit when the flow of hydraulic fluid in first conduit exceeds a selected threshold.

3. The apparatus according to claim 2, wherein said valve assembly comprises a pilot operated control valve assembly, said pilot operated control valve assembly including a first chamber with said first inlet, said second inlet, said first outlet, and a pilot piston assembly mounted for movement in said first chamber.

4. The apparatus according to claim 3, wherein said pilot piston assembly includes a pilot piston with a piston side facing said first inlet and a pilot rod, said pilot rod extending from said first chamber into a second chamber sealed from the first chamber, and said second chamber including said third inlet and said second outlet.

5. The apparatus according to claim 3, wherein:

said pilot operated control valve assembly includes a first chamber with a first inlet, a second inlet, an outlet, and a pilot piston assembly mounted for movement in said first chamber, and said pilot piston assembly includes a pilot piston with a piston side facing said first inlet and a pilot rod, said pilot rod extending from said first chamber into a second chamber sealed from the first chamber, and said second inlet is in fluid communication with said outlet of said first chamber so that fluid flows through said outlet of said first chamber during operational fluid flow conditions.

6. The apparatus according to claim 5, wherein said second chamber includes an inlet in communication with said third conduit, an outlet, and a valve poppet movably mounted in said second chamber between a closed position wherein said inlet of said second chamber is not in fluid communication with said outlet of said second chamber and one or more open positions wherein said inlet of said second chamber is in fluid communication with said outlet of said second chamber.

7. The apparatus according to claim 6, wherein when the fluid flow to said first inlet of said first chamber exceeds a preselected flow rate, back pressure at said first inlet of said first chamber will move said pilot piston and cause said pilot rod to move said valve poppet from said closed position to one of said open positions to allow fluid flow from said inlet of said second chamber to said outlet of said second chamber to open fluid flow between said third conduit and said outlet of said second chamber.

8. A pilot operated control valve assembly comprising:

a first chamber with a first inlet for fluid communication with a first conduit, a second inlet, an outlet for fluid communication with a second conduit, and a pilot piston assembly mounted for movement in said first chamber;

a second chamber having an inlet for communication with a third conduit, an outlet, and a valve poppet movably mounted in said second chamber between a closed position wherein said inlet of said second chamber is not in fluid communication with said outlet of said second chamber and one or more open positions wherein said inlet of said second chamber is in fluid communication with said outlet of said second chamber to allow fluid flow from the third conduit through the outlet of the second chamber;

said pilot piston assembly includes a pilot piston with a piston side facing said first inlet of said first chamber and a pilot rod, said pilot rod extending from said first chamber into said second chamber to selectively move said valve poppet, said second chamber being sealed from said first chamber;

said second inlet of said first chamber is in fluid communication with said outlet of said first chamber so that fluid flows from said outlet of said first chamber from said first inlet or said second inlet to allow fluid flow between the first conduit and the second conduit during operational fluid flow conditions; and wherein when the fluid flow to said first inlet of said first chamber exceeds a preselected flow rate, back pressure at said first inlet of said first chamber moves said pilot piston and cause said pilot rod to move said valve poppet from said closed position to one of said open positions to allow fluid flow from said inlet of said second chamber to said outlet of said second chamber to allow fluid flow from the third conduit through the outlet of the second chamber.

9. The pilot operated control valve assembly according to claim 8, wherein said pilot operated control valve includes a valve body with the first and second chambers located in said valve body.

10. The pilot operated control valve assembly according to claim 9, wherein said second inlet of said first chamber is formed in said valve body.

11. The pilot operated control valve assembly according to claim 10, wherein said valve body includes a valve body wall, said second inlet being formed by two or more orifices formed in said valve body wall.

12. The pilot operated control valve assembly according to claim 9, wherein said second inlet of said first chamber is formed by a passageway through said pilot piston.

13. The pilot operated control valve assembly according to claim 9, wherein said valve body comprises a cylindrical valve body.

14. A patient handling apparatus comprising:

a hydraulic circuit and a hydraulic cylinder to raise or lower a component of the patient handling apparatus;

a pump;

a reservoir; and said hydraulic cylinder having a rod, a cap end chamber, and a rod end chamber, said hydraulic circuit having a control valve assembly operable to direct the flow of hydraulic fluid between said pump, said hydraulic cylinder, and said reservoir, and said control valve assembly further configured to selectively open fluid communication between a first chamber of said cap end and rod end chambers of said hydraulic cylinder and said reservoir based on the flow condition of the hydraulic fluid flowing to a second chamber of said cap end and rod end chambers of said hydraulic cylinder to thereby allow faster evacuation of the hydraulic fluid from said first chamber of said hydraulic cylinder but to maintain flow through said control valve assembly between said pump and said second chamber of said hydraulic cylinder during operational flow conditions.

15. The patient handling apparatus according to claim 14, further comprising:

a frame;

a base; and a lift assembly supporting said frame relative to said base, said hydraulic cylinder being configured to extend or retract said lift assembly to thereby raise or lower said base or said frame with respect to the other.

16. The patient handling apparatus according to claim 15, wherein said first chamber comprises said cap end chamber, and said second chamber comprises said rod end chamber, and said control valve assembly being configured to selectively open to allow fluid to discharge at least some of the hydraulic fluid from said cap end chamber to said reservoir based on the flow condition of the hydraulic fluid flowing to said rod end chamber.

17. The patient handling apparatus according to claim 16, wherein said control valve assembly is configured to selectively open when there is a high flow condition to said rod end chamber of said hydraulic cylinder to thereby allow faster discharge of the hydraulic fluid from said cap end chamber of said hydraulic cylinder to the reservoir.

18. The patient handling apparatus according to claim 17, wherein said control valve assembly includes a pilot operated control valve.

19. The patient handling apparatus according to claim 18, wherein said control valve assembly comprises:

a first chamber with a first inlet, a second inlet, an outlet, and a pilot piston assembly mounted for movement in said first chamber;

said pilot piston assembly including a pilot piston with a piston side facing said first inlet and a pilot rod, and said pilot rod extending from said first chamber into a second chamber sealed from the first chamber;

said second inlet of said first chamber being in fluid communication with said outlet of said first chamber so that fluid flows from said outlet of said first chamber;

said second chamber forming said pilot valve and including an inlet, an outlet, and a valve poppet movably mounted in said second chamber between a closed position wherein said inlet of said second chamber is not in fluid communication with said outlet of said second chamber and one or more open positions wherein said inlet of said second chamber is in fluid communication with said outlet of said second chamber; and wherein when the fluid flow to said first inlet of said first chamber exceeds a preselected flow rate, back pressure at said first inlet of said first chamber will move said pilot piston and cause said pilot rod to move said valve poppet from said closed position to one of said open positions to allow fluid flow from said inlet of said second chamber to said outlet of said second chamber.

20. The patient handling apparatus according to claim 14, wherein said patient handling apparatus comprises an emergency cot.

* * * * *